US012451617B2

(12) United States Patent
Suh et al.

(10) Patent No.: US 12,451,617 B2
(45) Date of Patent: Oct. 21, 2025

(54) ELECTRONIC DEVICE WITH ANTENNA MODULES

(71) Applicant: LG ELECTRONICS INC., Seoul (KR)

(72) Inventors: Yusuhk Suh, Seoul (KR); Dongik Lee, Seoul (KR); Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/645,299

(22) Filed: Apr. 24, 2024

(65) Prior Publication Data

US 2024/0429621 A1 Dec. 26, 2024

(30) Foreign Application Priority Data

Jun. 23, 2023 (KR) ........................ 10-2023-0081105

(51) Int. Cl.
*H01Q 21/06* (2006.01)
*H01Q 1/22* (2006.01)
*H01Q 9/04* (2006.01)

(52) U.S. Cl.
CPC ......... *H01Q 21/065* (2013.01); *H01Q 1/2283* (2013.01); *H01Q 9/0414* (2013.01)

(58) Field of Classification Search
CPC .. H01Q 21/065; H01Q 1/2283; H01Q 9/0414; H01Q 1/24
See application file for complete search history.

(56) References Cited

U.S. PATENT DOCUMENTS

2018/0159203 A1* 6/2018 Baks ...................... H01Q 9/045

FOREIGN PATENT DOCUMENTS

| | | |
|---|---|---|
| KR | 20200136156 | 12/2020 |
| KR | 20200141339 | 12/2020 |
| KR | 20230083635 | 6/2023 |

OTHER PUBLICATIONS

Korean Intellectual Property Office Application No. 10-2023-0081105, Notice of Allowance dated Feb. 19, 2025, 6 pages.
Korean Intellectual Property Office Application No. 10-2023-0081105, Office Action dated Sep. 25, 2024, 3 pages.

* cited by examiner

*Primary Examiner* — Dieu Hien T Duong
(74) *Attorney, Agent, or Firm* — LEE, HONG, DEGERMAN, KANG & WAIMEY

(57) ABSTRACT

An antenna module implemented as a multi-layered package includes: a printed circuit board (PCB) having a plurality of layers; an array antenna portion including a plurality of antenna elements disposed on the PCB; a radio frequency integrated circuit (RFIC) chip bonded to a second surface of the PCB, the second surface being another outermost surface of the PCB; and a plurality of signal connection lines connected from the RFIC chip to the array antenna portion. A length of each of the plurality of signal connection lines may be a length of a connection line connected between the RFIC chip and the array antenna portion, and the plurality of signal connection lines may have the same length.

12 Claims, 17 Drawing Sheets

(a)

(b)

(a)

(b)

(a)

(b)

(a)

(b)

ELECTRONIC DEVICE WITH ANTENNA MODULES

CROSS-REFERENCE TO RELATED APPLICATION

Pursuant to 35 U.S.C. § 119, this application claims the benefit of earlier filing date and right of priority to Korean Application No(s). 10-2023-0081105, filed on Jun. 23, 2023, the contents of which are all incorporated by reference herein in its entirety.

TECHNICAL FIELD

The present disclosure relates to an electronic device, and more particularly, to an electronic device with antenna modules that wirelessly receive data.

BACKGROUND

As image technology changes from analog to digital, development has been made from SD (Standard-Definition) to HD (Hi-Definition) to provide an image closer to a real world. SD supports a resolution of 704×480 and consists of about 350,000 pixels, and HD is divided into HD and Full HD. Between them, Full HD supports a resolution of 1920×1080 and consists of 2 million pixels to provide a significantly higher quality image compared to SD.

Recent image technology is growing one step further to Ultra High-Definition (UHD) beyond Full HD, and the UHD, which supports high image quality and ultra-high resolution, is spotlighted as a next-generation media environment. The UHD supports 4K (3840×2160) and 8K (7680×4320) resolutions and surround audio of up to 22.2 channels. Compared to the HD, the UHD provides 4 times higher picture quality than the 4K UHD, and the 8K UHD provides 16 times higher image quality than the HD.

In recent years, a wireless display system that wirelessly transmits such a high-resolution image to a display device has emerged.

The wireless display system is a system that transmits and receives A/V data between an A/V transmitting device and an A/V receiving device through a local area network.

The A/V receiving device displays A/V data received from the A/V transmitting device.

An example of the A/V transmitting device may be a transmission box having an antenna module that wirelessly transmits A/V data.

An example of the A/V receiving device may be a display device provided with an antenna module that receives A/V data transmitted from the A/V transmitting device to output the received A/V data.

The display device may include a pair of antenna modules and an IR module located between the pair of antenna modules, and the pair of antenna modules may be disposed to spaced apart from each other on left and right sides thereof.

In the wireless display system, an antenna module of the A/V transmitting device may be located on the left or right side of the display device, and in this case, a pair of antenna modules provided in the display device may receive data transmitted from the antenna module of the A/V transmitting device in a two-stream method, and the display device may output an image.

When the A/V transmitting device is disposed on the left or right side of the display device, one of the pair of antenna modules of the display device cannot receive data because its signal is blocked by the IR module, and the display device operates with one stream.

When operating with one stream, its compression rate must be doubled compared to the case with two streams to transmit and receive data at the same level as in the case of two streams, but when the compression rate is increased, its image quality level may be decreased.

SUMMARY

An aspect of the present disclosure is to provide an electronic device capable of performing wireless communication of A/V data regardless of the location of an A/V transmitting device.

Another aspect of the present disclosure is to perform A/V wireless communication in an optimized manner according to an array antenna disposition structure of an A/V transmitting device and an electronic device.

Still another aspect of the present disclosure is to perform A/V wireless communication in an optimized manner in consideration of the location of an A/V transmitting device and an electronic device, and the polarization characteristics of an array antenna.

Yet still another aspect of the present disclosure is to provide seamless A/V wireless communication even when an obstacle is disposed on a wireless communication path between an A/V transmitting device and an electronic device.

Yet still another aspect of the present disclosure is to implement an antenna module that is capable of transmitting signals over a long distance to a front area of an A/V transmission device and that is also capable of transmitting signals upward.

Yet still another aspect of the present disclosure is to implement an antenna module that is capable of implementing a wider beam coverage in side regions of an A/V transmission device than that in a front or bottom area.

An antenna module implemented as a multi-layered package according to the present disclosure includes: a printed circuit board (PCB) having a plurality of layers; an array antenna portion including a plurality of antenna elements disposed on the PCB; a radio frequency integrated circuit (RFIC) chip bonded to a second surface of the PCB, the second surface being another outermost surface of the PCB; and a plurality of signal connection lines configured to connect from the RFIC chip to the array antenna portion. A length of each of the plurality of signal connection lines may be a connected length between the RFIC chip and the array antenna portion, and the plurality of signal connection lines may have the same length.

According to an embodiment, each of the plurality of antenna elements may have a two-patch antenna structure, a first patch antenna of the two patch antennas may be located on a first surface of the PCB, and the first surface may be an outermost surface of the PCB. A second patch antenna of the two patch antennas may be disposed inside the PCB, and a portion of the first patch antenna and a portion of the second patch antenna are stacked to overlap each other. The second surface may be another outermost surface of the PCB.

According to an embodiment, each of the plurality of signal connection lines may be disposed between the second patch antenna inside the PCB and the RFIC chip. Each of the plurality of signal connection lines may include a first part on the second surface of the PCB, a third part forming a coplanar waveguide structure inside the PCB, a second part electrically connecting the first part and the third part, and a fourth part electrically connect the third part and one of the second patch antennas.

According to an embodiment, a first ground region configured as a metal surface may be defined between the coplanar waveguide structure and the RFIC chip, and a second ground region may be defined between the coplanar waveguide structure and the second patch antenna.

According to an embodiment, each of the plurality of antenna elements may have a patch antenna structure, the patch antenna may be located on a first surface of the PCB, and the first surface may be an outermost surface of the PCB. The plurality of signal connection lines may be fed by being connected respectively to the patch antennas of the plurality of antenna elements disposed inside the PCB. A length of each of the plurality of signal connection lines may be a length of a connection line connected between the RFIC chip and the patch antenna, and the plurality of signal connection lines may have the same length.

An electronic device according to an embodiment of the present disclosure may perform wireless communication of A/V data regardless of the location of an A/V transmitting device through first and second antenna structures in which a plurality of array antennas are disposed.

Furthermore, the A/V transmitting device may transmit two streams of data, thereby minimizing video quality deterioration that occurs when increasing a data compression rate.

In addition, since a horizontally polarized antenna and a vertically polarized antenna can be disposed together on one substrate, thereby allowing an antenna module to be compact and providing a high data reception rate.

Moreover, horizontally and vertically polarized signals may be used according to an array antenna disposition structure of the A/V transmitting device and the electronic device, thereby performing A/V wireless communication with reduced mutual interference while increasing a communication capacity.

Besides, horizontally and vertically polarized signals may be used in consideration of the location of the A/V transmitting device and electronic device and the polarization characteristics of the array antennas, thereby performing A/V wireless communication with reduced mutual interference while increasing a communication capacity.

In addition, even when an obstacle is disposed on a wireless communication path between the A/V transmitting device and the electronic device, a beamforming direction may be changed and reflected waves may be used, thereby providing seamless A/V wireless communication.

Also, the number of array antennas disposed in a front area of the antenna module of the A/V transmitting device may be greater than the number of antennas in a side region or bottom region. Accordingly, signals can be transmitted over a longer distance in the front area of the antenna module than in the side region or bottom region. Also, an antenna module that has two-dimensional array antennas and is capable of transmitting signals even upward through beamforming can be implemented.

Also, the number of array antennas disposed in side regions of the antenna module of the A/V transmitting device may be greater than the number of antennas in other areas.

Accordingly, an antenna module capable of achieving a wider beam coverage in the side regions than that in a front or bottom region can be implemented.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

DETAILED DESCRIPTION OF THE EMBODIMENTS

A description will now be given in detail of specific embodiments of the present disclosure, together with drawings.

Hereinafter, a description will be given in more detail of embodiments related to the present disclosure, with reference to the accompanying drawings. In general, a suffix such as "module" and "unit" may be used to refer to elements or components. Use of such a suffix herein is merely intended to facilitate description of the specification, and the suffix itself is not intended to give any special meaning or function.

A video/audio (hereinafter referred to as A/V) transmitting device according to an embodiment of the present disclosure, which is, for example, an intelligent device in which a computer support function is added to a broadcast receiving function, may have an easier-to-use interface such as a handwriting input device, a touchscreen, or a spatial remote controller as an Internet function is added thereto while thoroughly performing the broadcast receiving function.

Furthermore, the A/V transmitting device may be connected to the Internet and a computer with the support of a wired or wireless Internet function to perform functions such as e-mailing, web browsing, banking, or gaming. A standard general-purpose OS may be used to perform these various functions.

Accordingly, various applications may be freely added to or deleted from a general-purpose OS kernel, for example, thereby allowing the A/V transmitting device described therein to perform various user-friendly functions.

Figure 1:
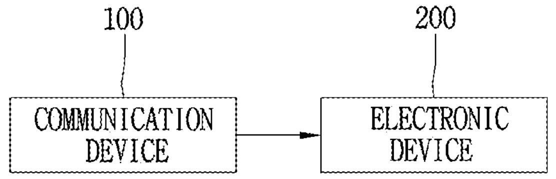
FIG. 1 is a diagram explaining a configuration of a wireless display system according to the present embodiment.

FIG. 1 is a diagram explaining a configuration of a wireless display system according to the present embodiment.

Referring to FIG. 1, a wireless display system 1 according to the present embodiment includes a communication device 100 and an electronic device 200.

The wireless display system 1 may be a system in which the communication device 100 wirelessly transmits A/V data to the electronic device 200 and the electronic device 200 outputs the A/V data.

The communication device 100 may be a device capable of encoding video and audio and wirelessly transmitting the encoded video and audio content.

An example of the communication device 100 may be an all-in-one (AIO) box capable of transmitting data, and may be, for example, a set-top box.

Another example of the communication device 100 may be connected to an external device such as a set-top box or a USB memory. The communication device 100 may transmit a video signal or an audio signal received from an external device connected thereto to the electronic device 200.

The electronic device 200 may be a display device capable of wirelessly receiving the encoded video and audio, and decoding the received video and audio.

The communication device 100 and the electronic device 200 may constitute a video wall display system.

In a video wall, a display having a thin bezel plays an important role in the visualization of video content. In order to efficiently implement a thin bezel, it is efficient to provide only components that can play a minimal role in the display, and to perform circuits or components for major functions in a separate device.

The communication device 100 may determine a type of video content and determine a compression rate of the video content based on the determined type. The compression rate of the video content may be defined as a ratio between a size of video data before encoding and a size of video data after encoding.

The type of video content may include a still image type, a general video type, and a game video type.

The communication device 100 may compress the video content according to the determined compression rate, and wirelessly transmit the compressed video content to the electronic device 200.

The electronic device 200, which may be, for example, a display device, may restore the compressed video content received from the communication device 100, and display the restored video content on a display.

Figure 2:
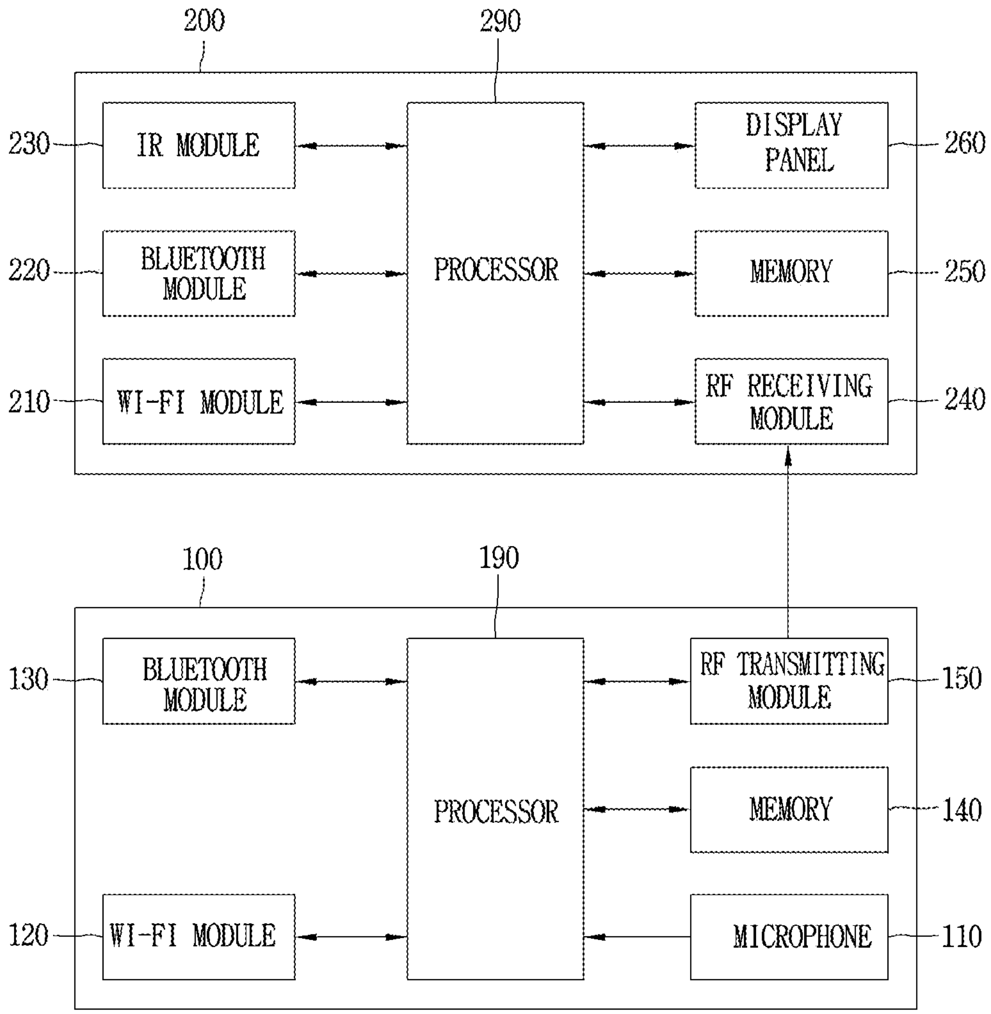
FIG. 2 is a block diagram explaining a detailed configurations of a communication device 100 and an electronic device 200.

FIG. 2 is a block diagram explaining a detailed configurations of a communication device 100 and an electronic device 200.

Referring to FIG. 2, the communication device 100 may include a microphone 110, a Wi-Fi module 120, a Bluetooth module 130, a memory 140, an RF transmitting module 150, and a processor 190.

The microphone 110 may receive an audio signal and transfer the audio signal to the processor 190.

The microphone 110 may receive a voice uttered by a user.

The Wi-Fi module 120 may perform wireless communication through the Wi-Fi standard.

The Wi-Fi module 120 may perform wireless communication with an external device or the electronic device 200 through the Wi-Fi standard.

The Bluetooth module 130 may perform wireless communication through the Bluetooth Low Energy (BLE) standard.

The Bluetooth module 130 may perform wireless communication with an external device such as a remote controller or the electronic device 200 through the Bluetooth Low Energy (BLE) standard.

The memory 140 may store a program for signal processing and control, and may store signal-processed video, audio, or data signals.

The memory 140 may perform a function for temporarily storing video, audio, or data signals received from the outside, and may store information on a predetermined image through a channel storage function.

The RF transmitting module 150 may transmit an A/V signal to the RF receiving module 240 of the electronic device 200 through Radio Frequency (RF) communication.

The RF transmitting module 150 may transmit an A/V signal compressed in a digital form to the RF receiving module 240.

The RF transmitting module 150 may transmit the A/V signal to the RF receiving module 240 through one or more channels.

The processor 190 may control an overall operation of the communication device 100.

The processor 190 may be configured in the form of a system-on-chip (SoC).

The processors 190 may be provided in plurality.

The processor 190 may compress a video signal or an audio signal received from the outside, and transfer the compressed signal to the RF transmitting module 150.

The processor 190 may include an encoder for compressing a video signal or an audio signal.

The processor 190 may be referred to as a main SoC.

The processor 190 may have one or more interfaces for connection with external devices. For example, the processor 190 may have one or more HDMI ports, and one or more USB ports.

The processor 190 may include a tuner that receives broadcast signals.

The electronic device 200 may include a Wi-Fi module 210, a Bluetooth module 220, an IR module 230, an RF receiving module 240, a memory 250, a display panel 260, and a processor 290.

The Wi-Fi module 210 may perform wireless communication through the Wi-Fi standard.

The Wi-Fi module 120 may perform wireless communication with an external device or the communication device 100 through the Wi-Fi standard.

The Bluetooth module 220 may perform wireless communication through the Bluetooth Low Energy (BLE) standard.

The Bluetooth module 220 may perform wireless communication with an external device such as a remote controller or the A/V transmitting device 200 through the Bluetooth Low Energy (BLE) standard.

The IR module 230 may receive a signal from a remote controller (not shown) through infrared (IR) communication.

The RF receiving module 240 may receive an A/V signal from the RF transmitting module 150.

The RF receiving module 240 may include a plurality of antennas. The RF receiving module 240 may be disposed below the display panel 260.

An example of the RF receiving module 240 may include a first antenna module and a second antenna module. Each of the first antenna module and the second antenna module may include a plurality of antennas.

Another example of the RF receiving module 240 may include one antenna module, and the antenna module may include a plurality of antennas.

The RF receiving module 240 may receive an A/V signal compressed in a digital form from the RF transmitting module 150, and transfer the received A/V signal to the processor 290.

The memory 250 may store a program for signal processing and control, and may store signal-processed video, audio, or data signals.

The display panel 260 may be a display panel 260 capable of displaying a video signal received from the processor 290. An example of the display panel 260 may be an LED panel.

The display panel 260 may display a video signal according to the driving of a timing controller (not shown).

The processor 290 may control an overall operation of the electronic device 200.

The processor 290 may restore the compressed A/V signal received by the RF receiving module 240. To this end, the processor 290 may include a decoder.

Meanwhile, the antenna module according to the present disclosure may be disposed in a vertical disposition structure or a horizontal disposition structure. In this regard, FIG. 3 shows a disposition structure of an antenna module disposed in an electronic device according to embodiments.

Figure 3:
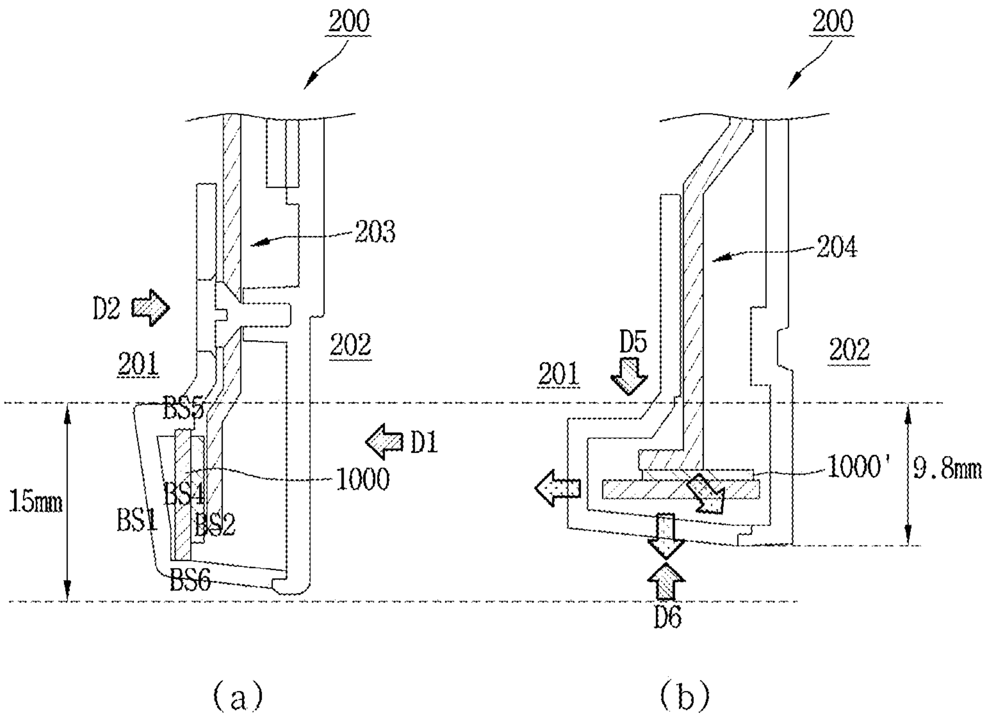
FIG. 3 is a diagram illustrating a process of recognizing an absence of a viewer and recognizing a distance between an A/V transmitting device and an A/V receiving device in accordance with an embodiment of the present disclosure.

Referring to (a) of FIG. 3, an antenna structure 1000 may be coupled to an end of a heat dissipation plate 203 disposed in a space between the first cover 201 and the second cover 202. The first cover 201 and the second cover 202 may correspond to a front cover and a rear cover, respectively. A length of a lower end of the first cover 201 to which the antenna structure 1000 is coupled may be implemented as a predetermined first length (e.g., 15 mm) or less. Upper and lower ends of the antenna structure 1000 may be coupled to upper and lower grooves of the first cover 201 to allow the antenna structure 1000 to be vertically disposed.

An end of the heat dissipation plate 203 and the antenna structure 1000 may be disposed in a vertical structure with respect to a horizontal plane. The end of the heat dissipation plate 203 and the antenna structure 1000 may be disposed in parallel with respect to the Y-axis, which is a vertical axis. To this end, the heat dissipation plate 203 may be coupled to the first and second covers 201, 202 and the antenna structure 1000 through an assembly structure such as a screw or a separate compression structure on front and rear surfaces of the heat dissipation plate 203. The assembly structure or the compression structure may be assembled or compressed in a first direction D1, which is a front direction, or in a second direction D2, which is a rear direction.

The antenna structure 1000 may include a plurality of side surfaces BS1 to BS6. A first surface BS1 of the plurality of side surfaces may be configured to face the front direction D1 of the electronic device 200, and a second surface BS2 of the plurality of side surfaces to face the rear direction D2 of the electronic device 200. A third surface (not shown) of the plurality of side surfaces may be configured to face a left direction of the electronic device 200, and a fourth surface BS4 of the plurality of side surfaces to face a right direction of the electronic device 200. A fifth surface BS5 of the plurality of side surfaces may be configured to face a bottom direction D3 of the electronic device 200.

Referring to FIG. 3(*b*), an antenna structure 1000 may be coupled to an end of a heat sink 204 disposed in a space between a first cover 201 and a second cover 202. A length of a lower end of the first cover 201 to which the antenna module 300' is coupled may be implemented as a predetermined second length (e.g., 9.8 mm) or less. One side end and a rear surface of the antenna structure 1000' may be coupled to the side region and a rear surface of the first cover 201 to allow the antenna structure 1000' to be disposed parallel to a horizontal plane. The assembly structure or the compression structure may be assembled or compressed in a fifth direction D5, which is a top direction, or in a sixth direction D6, which is a bottom direction.

An end of the heat dissipation plate 204 and the antenna structure 1000 may be disposed in a horizontal structure so as to correspond to a horizontal plane. The end of the heat dissipation plate 204 and the antenna structure 1000' may be disposed in parallel with respect to the X-axis, which is a horizontal axis. To this end, the heat dissipation plate 204 may be coupled to the first cover 201 and the antenna structure 1000' through an assembly structure such as a screw or a separate compression structure on front and rear surfaces of the heat dissipation plate 204. The assembly structure or the compression structure may be assembled or compressed in a first direction D1, which is a bottom direction, or in a second direction D2, which is a top direction.

Meanwhile, an antenna module disposed in an electronic device according to the present disclosure will be described. In this regard, FIG. 4 shows a structural view in which an electronic device provided with a display performs AV wireless communication with other communication devices that may be disposed in various locations.

Figure 4:
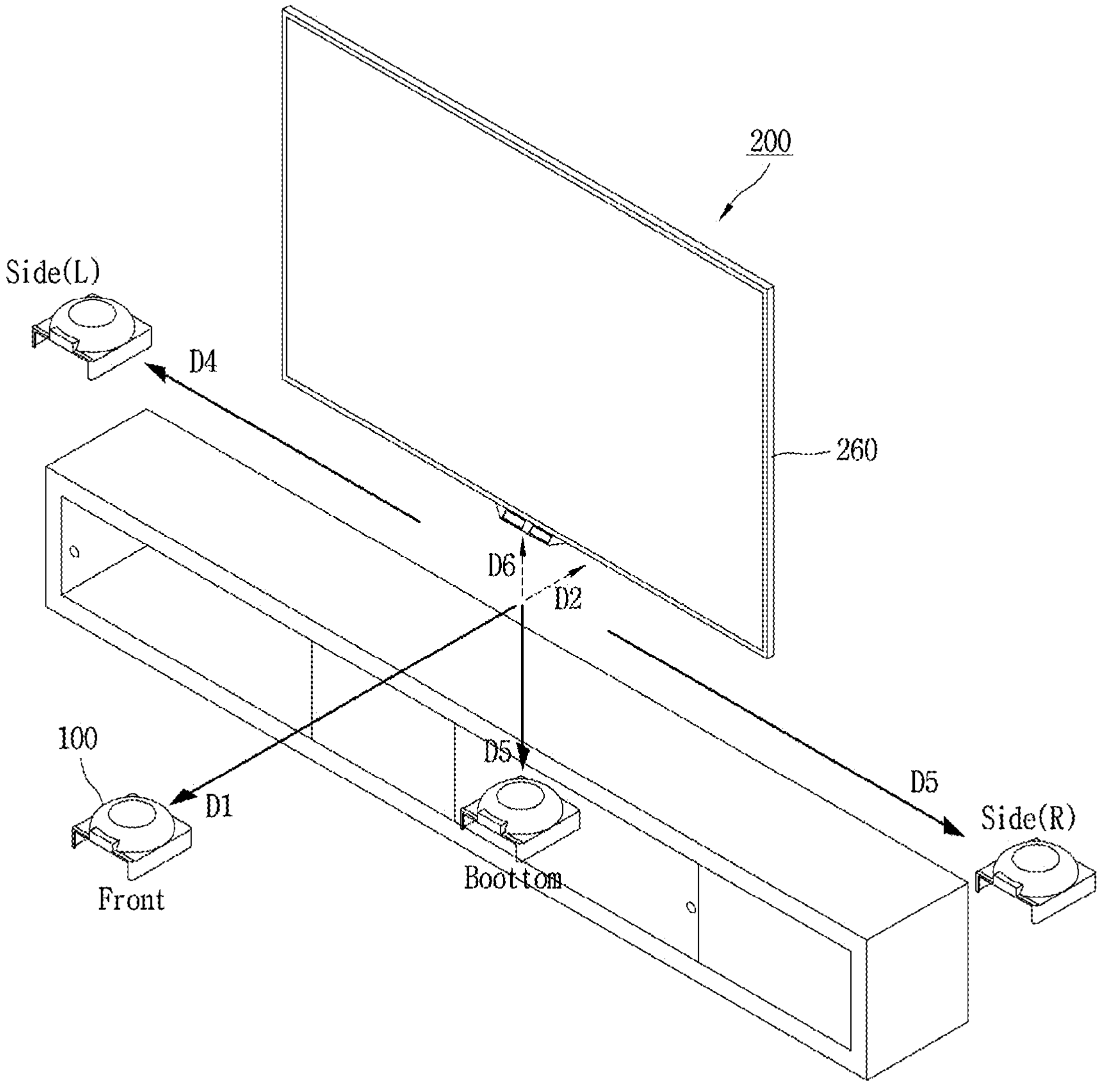
FIG. 4 is a structural view in which an electronic device provided with a display performs AV wireless communication with other communication devices that may be disposed in various locations.

Referring to FIG. 4, the communication device 100 may be disposed in a front direction, a bottom direction, one side direction, or the other side direction of the electronic device 200. The communication device 100 may be an AV transmitting device that transmits AV content to the electronic device 200. The communication device 100 may be a set-top box, but is not limited thereto. The electronic device 200 may be an AV receiving device that receives AV content from the communication device 100. The electronic device 200 may be a display device, but is not limited thereto. The electronic device 200 receives data from the communication device 100, but may also transmit data to the communication device 100.

The communication device 100 may be disposed in the first direction D1 that is the front direction of the electronic device 200. In this regard, the electronic device 200 may transmit or receive a wireless signal in the first direction D1, which is the front direction. A rear direction of the electronic device 200 may be defined as the second direction D2.

The communication device 100 may be disposed in the third direction D3, which is the left direction of the electronic device 200, or in the fourth direction D4, which is the right direction thereof. In this regard, the electronic device 200 may transmit or receive a wireless signal in the fourth direction D4 or the fifth direction D5, which is the left direction.

The communication device 100 may be disposed in the fifth direction D5 that is the bottom direction of the electronic device 200. In this regard, the electronic device 200 may transmit or receive a radio signal in the fifth direction D5, which is the bottom direction. The top direction of the electronic device 200 may be defined as the sixth direction D6.

Meanwhile, a wireless link on a line-of-sight (LOS) path may not be formed due to an obstacle between the communication device 100 and the electronic device 200. In this regard, the electronic device 200 may transmit and receive a wireless signal through a wireless link on a non-LOS path such as a reflection path. The communication device 100 may transmit or receive a wireless signal in a ceiling direction, which is an upper front direction. Communication is enabled between the communication device 100 and the electronic device 200 through a wireless signal reflected from a ceiling or wall surface.

Meanwhile, an electronic device according to the present disclosure may include a plurality of antenna modules (structures) to perform wireless communication with a communication device through the plurality of antenna modules (structures). In this regard, FIG. 5 shows a structure of an antenna module below an electronic device.

Figure 5:
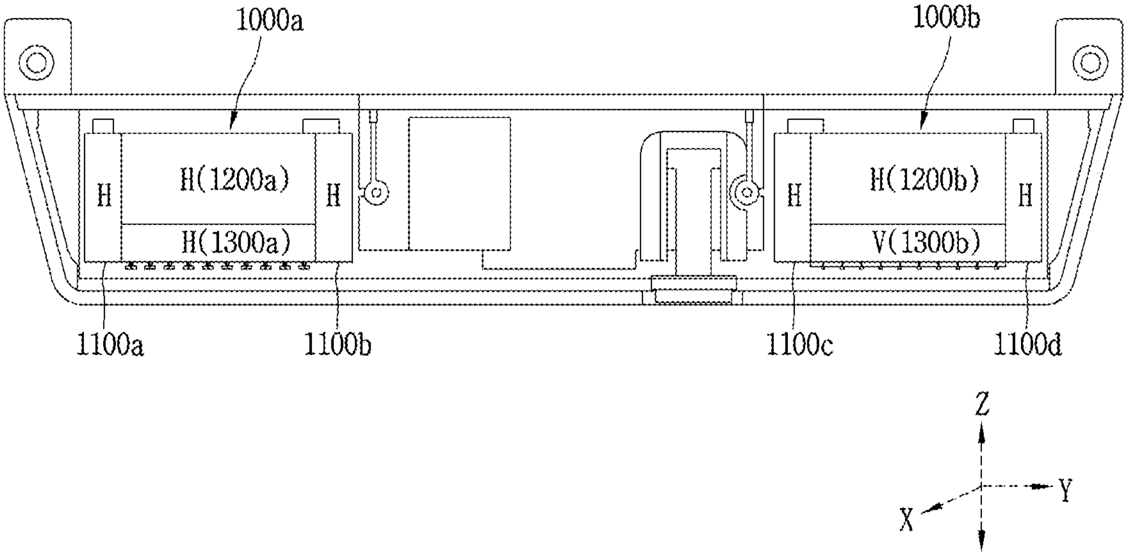
FIG. 5 shows a structure of an antenna module below an electronic device.

Referring to FIGS. 3 to 5, the electronic device 200 may include a display panel 260 and an antenna module 1000*a*. The first and second antenna structures 1000*a*, 1000*b* may be disposed around the display panel 260. The first and second antenna structures 1000*a*, 1000*b* of FIG. 5 may correspond to the third and fourth antenna structures 1000*a*, 1000*b* of FIGS. 7A and 7B, respectively.

The first antenna structure 1000*a* may be disposed in one side region of the electronic device 200. The second antenna structure 1000*b* may be disposed in the other side region of the electronic device 200.

The first antenna structure 1000*a* may include a first array antenna 1200*a* and a second array antenna 1300*a*. The first array antenna 1200*a* operates as a horizontally polarized antenna that receives or transmit a signal in a front direction. The second array antenna 1300*a* operates as a horizontally polarized antenna that receives or transmits a signal in a bottom direction. The first array antenna 1200*a* may radiate a polarized signal that is polarized in the Y-axis direction to travel in the X-axis direction. The second array antenna 1300*a* may radiate a polarized signal that is polarized in the Y-axis direction to travel in a lower Z-axis direction.

The first antenna structure 1000*a* may further include a third array antenna 1100*a* and a fourth array antenna 1100*b*. The third array antenna 1100*a* operates as a horizontally polarized antenna that receives or transmits a signal in a left direction. The fourth array antenna 1100*b* operates as a horizontally polarized antenna that receives or transmits a signal in a right direction. The third array antenna 1100*a* may radiate a polarized signal that is polarized in the X-axis direction to travel in a left Y-axis direction. The fourth array antenna 1100*b* may radiate a polarized signal that is polarized in the X-axis direction to travel in a right Y-axis direction.

The second antenna structure 1000*b* may include a fifth array antenna 1200*b* and a sixth array antenna 1300*b*. The fifth array antenna 1200*b* may operate as a horizontally polarized antenna that receives or transmit a signal in a front direction. The sixth array antenna 1300*b* may operate as a vertically polarized antenna that receives or transmits a signal in a bottom direction. The fifth array antenna 1200*b* may radiate a polarized signal that is polarized in the Y-axis direction to travel in the X-axis direction. The sixth array antenna 1300*b* may radiate a polarized signal that is polarized in the X-axis direction to travel in a lower Z-axis direction.

The second antenna structure 1000*b* may further include a seventh array antenna 1100*c* and an eighth array antenna 1100*d*. The seventh array antenna 1100*c* and the eighth array antenna 1100*d* operate as horizontally polarized antennas. The seventh array antenna 1100*c* operates as a horizontally polarized antenna that receives or transmits a signal in a left direction. The eighth array antenna 1100*d* operates as a horizontally polarized antenna that receives or transmits a signal in a right direction. The seventh array antenna 1100*c* may radiate a polarized signal that is polarized in the X-axis direction to travel in a left Y-axis direction. The eighth array antenna 1100*d* may radiate a polarized signal that is polarized in the X-axis direction to travel in a right Y-axis direction.

Figure 6:
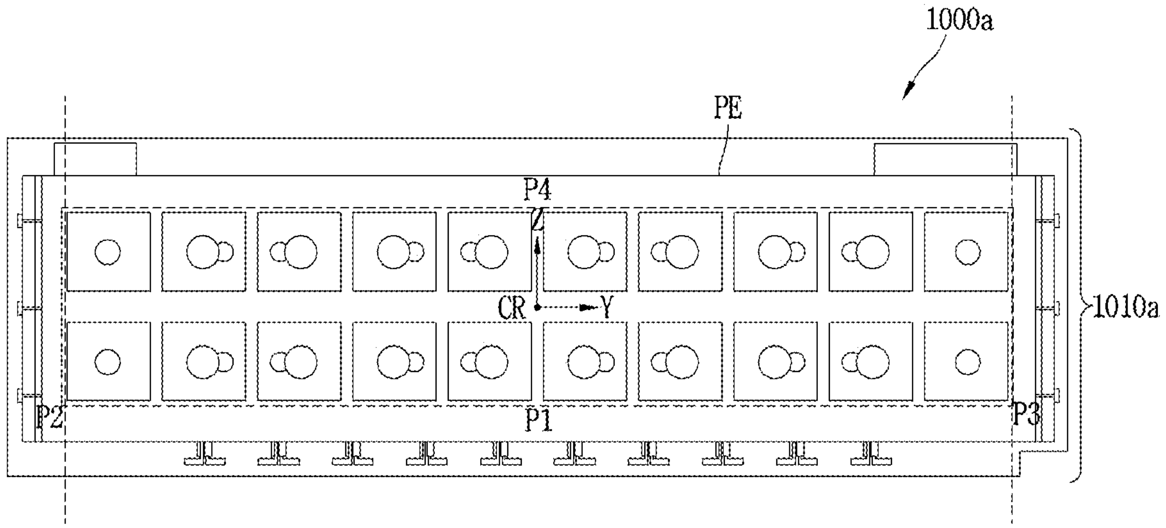
FIGS. 6 and 7 are front and sectional views illustrating a substrate having an antenna module that may be disposed on one side of an electronic device.
Figure 6:
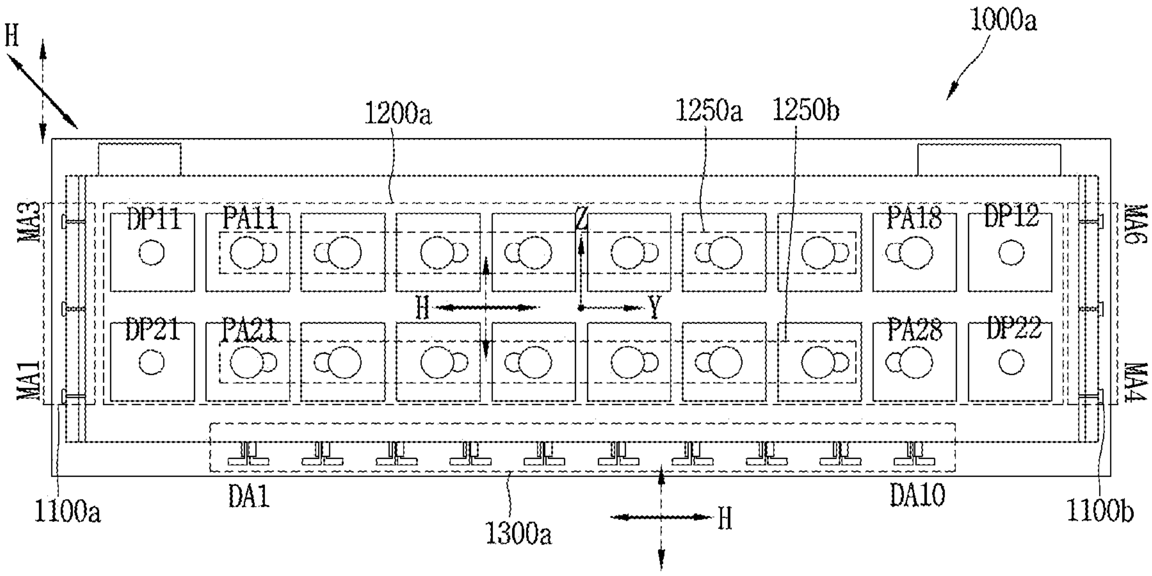
Figure 7:
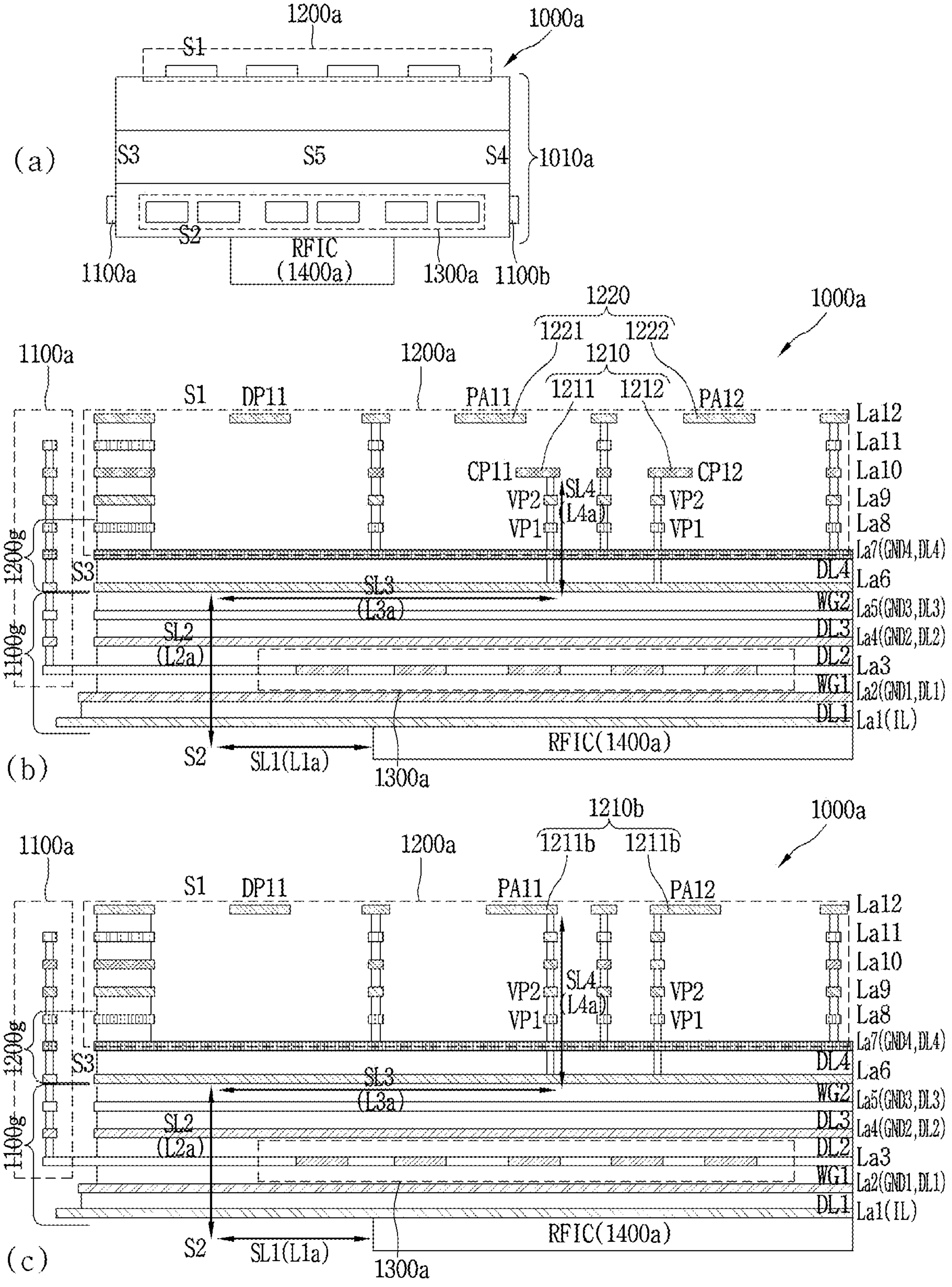
Figure 8:
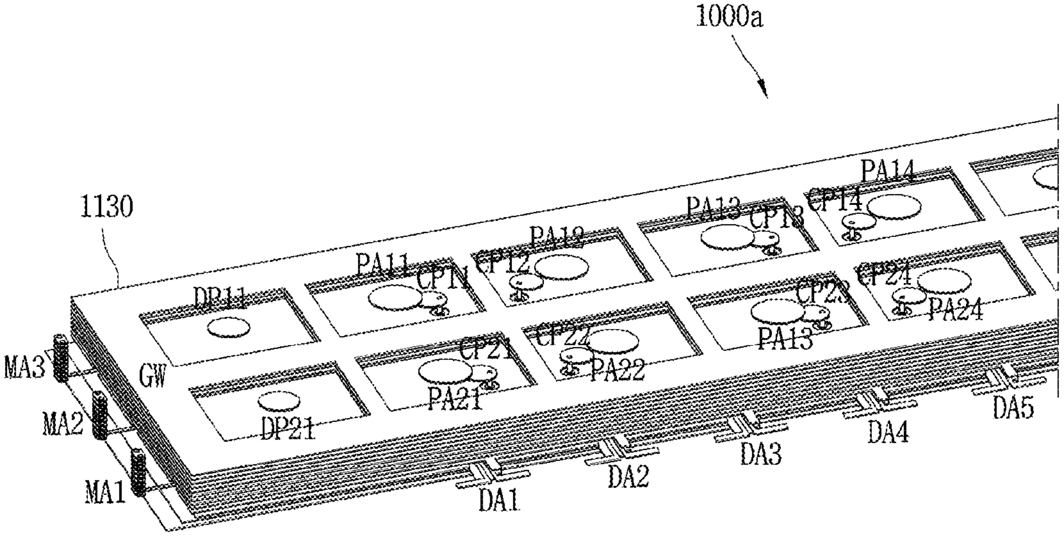
FIG. 8 shows a perspective view of the antenna module of FIG. 6 and an enlarged view of a partial area.
Figure 8:
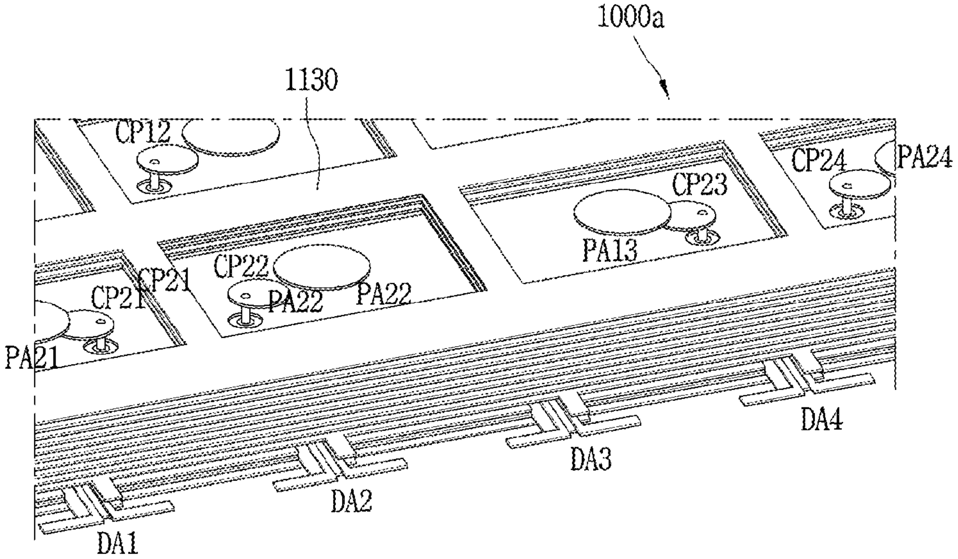

Hereinafter, an antenna module disposed in an electronic device according to the present disclosure will be described. In this regard, FIGS. 6 and 7 are front and sectional views illustrating a substrate having an antenna module that may be disposed on one side of an electronic device. FIG. 8 shows a perspective view of the antenna module of FIG. 6 and an enlarged view of a partial area.

(a) of FIG. 6 shows a substrate with an antenna module 1000*b* for each area. A substrate 1010*a* may include a central region CR and a periphery PE surrounding the central region CR. The periphery PE of the substrate 1010*a* may include a first part P1 to a fourth part P4. The first part P1 constitutes a bottom region of the substrate 1010*a*, and the second part P2 constitutes one side region of the substrate 1010*a*. The third part P3 constitutes another side region of the substrate 1010*a*, and the fourth part P4 constitutes a top region of the substrate 1010*a*.

Referring to FIGS. 5 and 6, the antenna module 1000*a* may include a substrate 1010*a*, a first array antenna 1200*a*, a second array antenna 1300*a*, a third array antenna 1100*a*, and a fourth array antenna 1100*b*. Since the third and fourth array antennas 1100*a* and 1100*b* are disposed on the one side region and the another side region of the substrate 1010*a*, they may be referred to as first and second side array antennas.

(a) of FIG. 7 is a sectional view of the antenna module 1000*a*, and (b) of FIG. 7 is a sectional view of the substrate 1010*a* shown for each layer. (a) of FIG. 8 shows a perspective view of one side region based on the center of the antenna module 1000*a*. (b) of FIG. 8 is an enlarged view illustrating an area where some of dipole antennas DA1 to DA4 constituting the second array antenna 1300*a* of the antenna module are disposed.

Referring to FIG. 7, an RFIC 1400*a* may be disposed on the first layer La1 of the antenna module 1000*a*. A plurality of ground layers may be disposed in an inner region of the antenna module 1000*a*. For example, first, second, third, and fourth ground layers GND1, GND2, GND3, and GND4 may be disposed on the second, fourth, fifth, and seventh layers La2, La4, La5, and La7.

Conductive patterns in the inner region of the antenna module 1000*a* may be stacked in a height direction with being spaced apart from one another by a plurality of dielectric layers. For example, a first dielectric layer GND1 may be disposed between the first and second layers La1 and La2, and a second dielectric layer GND2 may be disposed between the third and fourth layers La3 and La4. A third dielectric layer GND3 may be disposed between the fourth and fifth layers La4 and La5, and a fourth dielectric layer GND4 may be disposed between the sixth and seventh layers La6 and La7.

A plurality of coplanar waveguide layers may be disposed on the respective layers in the inner region of the antenna module 1000*a*. A first coplanar waveguide layer WG1 in which a plurality of signal connection lines and ground portions are formed may be disposed on the third layer La3. A second coplanar waveguide layer WG2 in which a plurality of signal connection lines and ground portions are formed may be disposed on the sixth layer La6.

It may be considered that a plurality of dielectric layers are disposed on respective layers corresponding to ground layers of the antenna module 1000*a*. In this regard, a plurality of dielectric layers may be disposed in the inner region of the antenna module 1000*a*. For example, first, second, third, and fourth dielectric layers DL1, DL2, DL3, and DL4 may be disposed on the second, fourth, fifth, and seventh layers La2, La4, La5, and La7.

Referring to FIG. 7, the first layer La1 may be an interface layer IL of the RFIC 1400*a*, and the second layer La2 is the first ground layer GND1 having ground and via. The first dielectric layer DL1 may be disposed between the first and second layers La1 and La2, and the second layer La2 may include the first ground layer GND1 and the first dielectric layer DL1.

The third layer La3 is a first coplanar waveguide layer WG1 in which a plurality of conductive patterns and ground portions are formed. The fourth layer La4 is the second ground layer GND2 including ground and via. The second dielectric layer DL2 may be disposed between the third and fourth layers La3 and La4, or the fourth layer La4 may include the second dielectric layer DL2.

The third dielectric layer DL3 may be disposed between the fourth and fifth layers La4 and La5, or the fifth layer La5 may include the third dielectric layer DL3. The fifth layer La5 is the third ground layer GND3 including ground and via. The sixth layer La6 is the second coplanar waveguide layer WG2 in which a plurality of conductive patterns and ground portions are formed. The fourth dielectric layer DL4 may be disposed between the sixth and seventh layers La6 and La7, or the seventh layer La7 may include the fourth dielectric layer DL4.

Referring to FIGS. 6 to 8, a ground wall (GW) 1130 is formed on the periphery PE of the substrate 1010*a* and includes vias connecting a plurality of layers. The ground wall (GW) 1130 is disposed in one axial direction and another axial direction between patch antennas PA11 to PA28 to surround each of the patch antennas PA11 to PA28.

The ground wall (GW) 1130 operates as a ground for radiation of the patch antennas PA11 to PA28 and may be referred to as a ground cavity wall. The ground wall (GW) 1130 suppresses side surface radiation and rear surface radiation of the patch antennas PA11 to PA28 having a front side radiation structure, and functions as a reflector to the front surface. In addition, the ground wall (GW) 1130 suppresses rear surface radiation in another side direction of monopole antennas MA1 to MA6 having a side surface radiation structure, and functions as a reflector toward the front side in one side direction. In addition, the ground wall (GW) 1130 suppresses rear surface radiation in a top direction of dipole antennas DA1 to DA10 having a bottom radiation structure, and functions as a reflector in a bottom direction.

The first array antenna 1200*a* may further include dummy pads DP11 to DP22 disposed on one side and another side of the patch antennas PA11 to PA28. Among the dummy pads DP11 to DP22, the first dummy pad DP11 is disposed between the first patch antenna PA11 in a first row and the second part P2. The second dummy pad DP12 is disposed between the second patch antenna PA12 in the first row and the second part P2. Among the dummy pads DP11 to DP22, the third dummy pad DP21 is disposed between the first patch antenna PA21 in a second row and the third part P3. The fourth dummy pad DP22 is disposed between the second patch antenna PA22 in the second row and the third part P3.

The ground wall (GW) 1130 may be formed to surround the dummy pads DP11 to DP22. First patch antennas 1220 of the plurality of patch antennas PA11 to PA28 may be connected to feed lines. The dummy pads DP11 to DP22 are not connected to the feed lines. Second patch elements 1220 of the plurality of patch antennas PA11 to PA28 are not connected to the feed lines.

A distance between the ground wall (GW) 1130 and the dummy pads DP11 to DP22, respective sizes thereof, and the like may be implemented within a predetermined range based on a half wavelength of an operating frequency of 60 GHz. Layer positions and sizes of conductive plates CP11 to CP28 corresponding to coupling pads and overlap areas with the patch antennas PA11 to PA28 may be designed in consideration of radiation characteristics and disposition characteristics.

Referring to FIGS. 3 and 6 to 8, the antenna module 1000*a* may further include a millimeter wave transceiver circuitry 1400*a*.

The substrate 1010*a* may include a first surface S1, a second surface S2, a periphery PE, and a central region CR. The periphery PE may be formed between the first surface S1 and the second surface S2. The first surface S1 may be opposite to the second surface S2. The substrate 1010*a* may be implemented as a multi-layer substrate. For example, the substrate 1010*a* may be implemented as a 12-layer substrate, but is not limited thereto, and may vary depending on applications. The first surface S1 of the substrate 1010*a* may correspond to a surface of a twelfth layer La12.

The substrate 1010*a* may have a plurality of side surfaces. Among the plurality of side surfaces, the first surface S1 may be disposed to face a front direction of the antenna module 1000*a*, and the second surface S2 may be disposed to face a rear direction of the antenna module 1000*a*. Among the plurality of side surfaces, the third and fourth surfaces S3 and S4 may be disposed to face left and right directions, respectively. Among the plurality of side surfaces, a fifth surface S5 may be configured to face a bottom direction of the antenna module.

The third array antenna 1100*a* and the fourth array antenna 1100*b* may be disposed on the second part P2 and the third part P3 of the periphery PE of the substrate 1010*a*. The third array antenna 1100*a* and the fourth array antenna 1100*b* may form beam patterns to side regions of the electronic device. The third array antenna 1100*a* and the fourth array antenna 1100*b* may radiate horizontally polarized signals to the side regions of the electronic device.

The third array antenna 1100*a* may include a plurality of monopole antennas MA1 to MA3 disposed on the second part P2 of the periphery PE of the substrate 1010*a*. The fourth array antenna 1100*b* may include the plurality of monopole antennas MA4 to MA6 disposed on the third part P3 of the periphery PE of the substrate 1010*a*. The third array antenna 1100*a* and the fourth array antenna 1100*b* may be implemented with three antenna elements on one side and another side of the periphery PE of the substrate 1010*a*, respectively. The third array antenna 1100*a* may be implemented as a 1×3 array antenna on one side of the substrate 1010*a*, but is not limited thereto. The fourth array antenna 1100*b* may be implemented as a 1×3 array antenna on another side of the substrate 1010*a*, but is not limited thereto.

The first array antenna 1200*a* may be disposed on the first surface S1 of the substrate 1010*a*. The first array antenna 1200*a* may form a beam pattern toward the front area of the electronic device. The first array antenna 1200*a* may radiate a horizontally polarized signal to the front area of the electronic device. The first array antenna 1200*a* may be implemented as 16 antenna elements on the center region CR of the substrate 1010*a*.

The first array antenna 1200*a* may include the plurality of patch antennas PA11 to PA18 and PA21 to PA28 disposed on the first surface S1 of the substrate 1010*a*. The dummy pads DP11 and DP21 may be disposed on one side of the patch antennas PA11 and P21 to suppress side surface radiation. The dummy pads DP12 and DP22 may be disposed on another side of the patch antennas PA11 and P21 to suppress side surface radiation. The first array antenna 1200*a* may be implemented as 16 2×8 array antennas on the center region CR of the substrate 1010*a*, but is not limited thereto.

Each patch antenna of the first array antenna 1200*a* may include a first patch antenna 1220 and a second patch element 1210. The second patch element 1210 may be stacked in a direction perpendicular to the first patch antenna 1220 such that signals of the first patch antenna 1220 are coupled. The center of the second patch element 1210 may be offset from the center of the first patch antenna 1220 in one axial direction.

A second gap between adjacent first patch elements 1221 and 1222 may be larger than a first gap between adjacent second patch elements 1211 and 1212. To this end, the first patch element 1221 in a first column may be disposed to be offset in the left direction with respect to the second patch element 1211 in the first column. Meanwhile, the first patch element 1222 in a second column may be disposed to be offset in the right direction with respect to the second patch element 1212 in the second column. A current flow direction of a signal applied to the second patch element 1211 in the first column is the left direction, and a current flow direction of a signal applied to the second patch element 1212 in the second column is the right direction. The current flow directions of the signals applied to the second patch elements 1211 and 1212 in the first and second columns are opposite to each other. Accordingly, a phase difference of the signals applied to the second patch elements 1211 and 1212 in the first and second columns is supposed to be 180 degrees so that the current flow directions can be the same. To this end, the RFIC 1400*a* may control a phase shifter such that the phase difference between the signals applied to the second patch elements 1211 and 1212 in the first and second columns is 180 degrees.

The second array antenna 1300*a* may be disposed on the first part P1 of the periphery PE of the substrate 1010*a*. The second array antenna 1300*a* may form a beam pattern toward the bottom region of the electronic device. The second array antenna 1300*a* may radiate a horizontally polarized signal to the bottom region of the electronic device.

The second array antenna 1300*a* may include a plurality of dipole antennas DA1 to DA10 disposed on the first part P1 of the periphery PE of the substrate 1010*a*. The second array antenna 1300*a* may be implemented as 10 antenna elements on the lower side of the periphery PE of the substrate 1010*a*. The second array antenna 1300*a* may be implemented as 10 1×10 array antennas on the lower side of the periphery PE of the substrate 1010*a*, but is not limited thereto.

The plurality of array antennas may be disposed in an X-axial direction (one axial direction) and a Y-axial direction (another axial direction) of the substrate 1010*a*. The third array antenna 1100*a* and the fourth array antenna 1100*b* may include a plurality of monopole antennas MA1 to MA3 and MA4 to MA6 disposed in the another axial direction. The first array antenna 1200*a* may include a plurality of patch antennas PA11 to PA18 and PA21 to PA28 disposed in the one axial direction. The second array antenna 1300*a* may include a plurality of dipole antennas DA1 to DA10 disposed in the one axial direction.

The millimeter wave transceiver circuitry 1400*a* may be disposed on the second surface S2. The millimeter wave transceiver circuitry 1400*a* may be configured to transmit and receive signals at frequencies between 10 GHz and 400 GHz using at least one of the first array antenna 1200*a*, the second array antenna 1300*a*, and the third and fourth array antennas 1100*a* and 1100*b*. The millimeter wave transceiver circuitry 1400*a* may be configured to transmit and receive signals at frequencies between 10 GHz and 400 GHz using at least one of the plurality of monopole antennas MA1 to MA6, the plurality of patch antennas PA11 to PA18 and PA21 to PA28, and the plurality of dipole antennas DA1 to DA10. The millimeter wave transceiver circuitry 1400*a* may be referred to as a radio frequency integrated chip (RFIC).

The number of elements of the first array antenna 1200*a* forming the beam pattern toward the front area may be set to be greater than the number of elements of the second array antenna 1300*a* forming the beam pattern toward the bottom region. The number of elements of the second array antenna 1300*a* forming the beam pattern toward the bottom region may be set to be greater than the number of elements of the third and fourth array antennas 1100*a* and 1100*b* forming the beam pattern toward the side regions.

In this regard, 16 pins among 32 pins of the RFIC 1400*a* may be connected to the first array antenna 1200*a* forming the beam pattern toward the front area. Ten pins of the 32 pins of the RFIC 1400*a* may be connected to the second array antenna 1300*a* forming the beam pattern toward the bottom region. 6 pins of the 32 pins of the RFIC 1400*a* may be connected to the third and fourth array antennas 1100*a* and 1100*b* forming the beam pattern toward the side regions.

In this regard, the first array antenna 1200*a* has the largest number of elements, so it can transmit signals over a long distance to the front area of the electronic device, but has a narrow beam coverage. The narrow beam coverage can be supplemented by changing a beam forming direction to a horizontal direction of the front area. Accordingly, the number of elements of the first array antenna 1200*a* may be plural in one axial direction and two in another axial direction. For example, the second array antenna 1300*a* may be implemented as 2×8 array antennas. A beam may be formed upward by a predetermined angle from the front direction through a phase difference between signals applied between the antenna elements in the first row and the antenna elements in the second row.

The electronic device needs to perform AV wireless communication with another electronic device disposed in a bottom region of the electronic device. For the AV wireless communication, beamforming may be implemented in units of narrow beam coverage in a horizontal direction, which is the one axial direction, in the bottom region of the electronic device. Meanwhile, it is not necessary to transmit a signal to a bottom region of the electronic device over a long distance.

Accordingly, the number of elements of the second array antenna 1300_a_ may be plural in the one axial direction and one in the another axial direction. For example, the second array antenna 1300_a_ may be implemented as 1×8, 1×10, or 1×12 array antennas.

Signals may be transferred to the side regions of the electronic device in an indoor radio environment where the electronic device is disposed. It is more important to implement a wide beam coverage for the side regions of the electronic device even without beamforming, than to implement a signal transmission over a long distance. In this regard, since the number of elements of the third and fourth array antennas 1100_a_ and 1100_b_ is the smallest, a wide beam coverage to the side regions of the electronic device can be achieved. Accordingly, the number of elements of the third and fourth array antennas 1100_a_ and 1100_b_ may be plural in the one axial direction and one in the another axial direction. For example, the third and fourth array antennas 1100_a_ and 1100_b_ may be implemented as 1×3 array antennas on one side and another side.

Figure 9A:
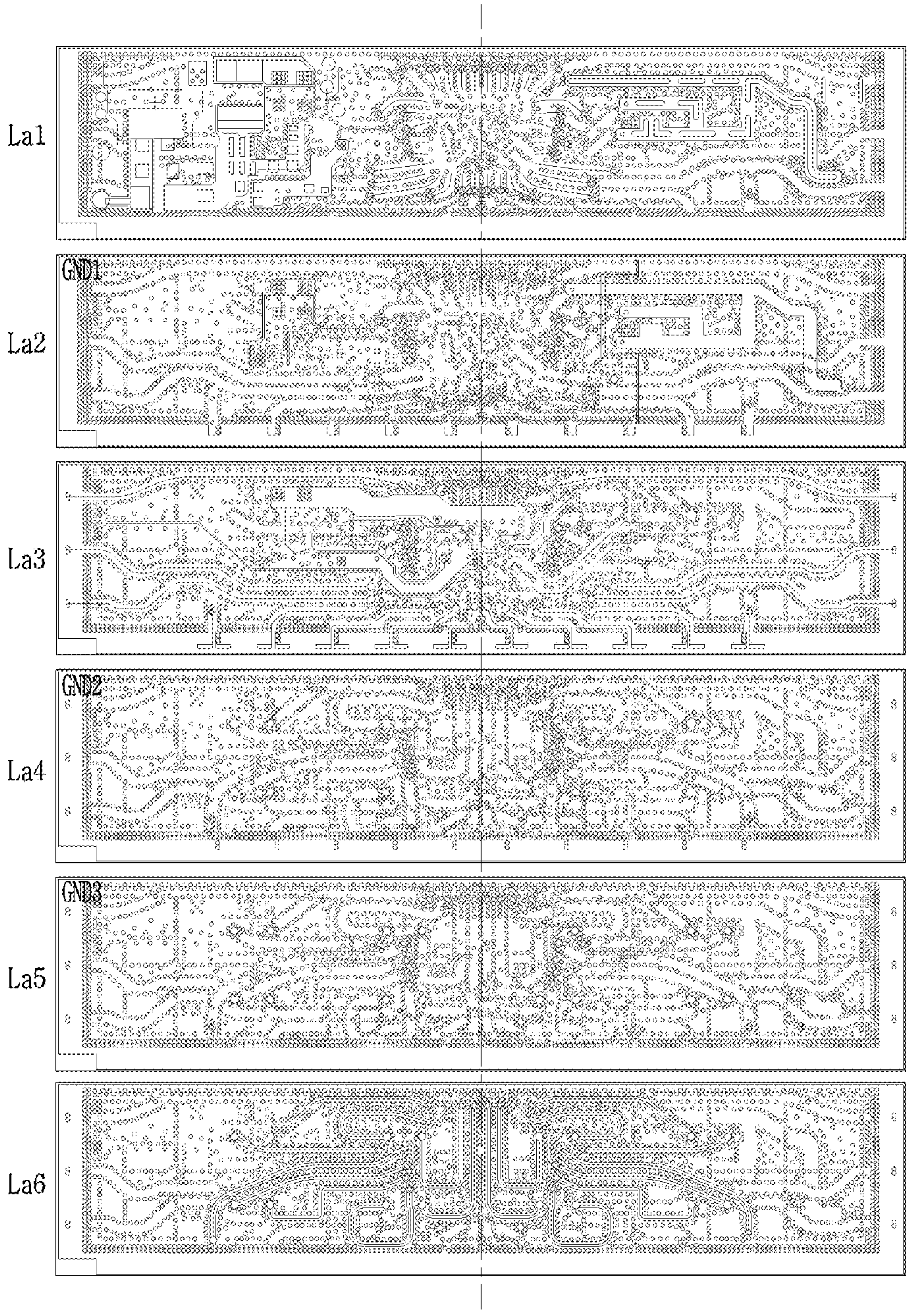
FIGS. 9A and 9B are front views illustrating the antenna module of FIG. 7 for each layer.
Figure 9B:
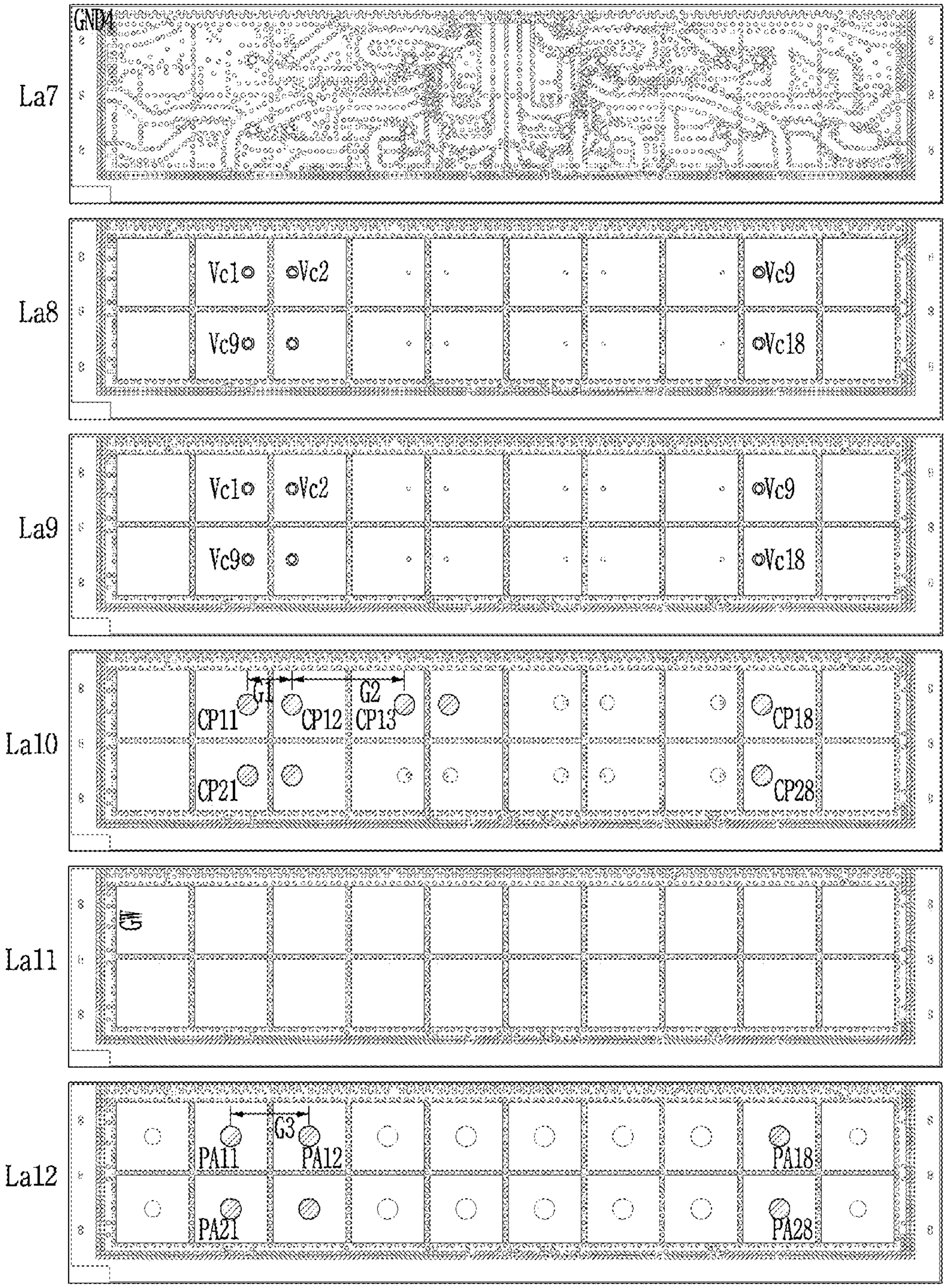
Figure 9C:
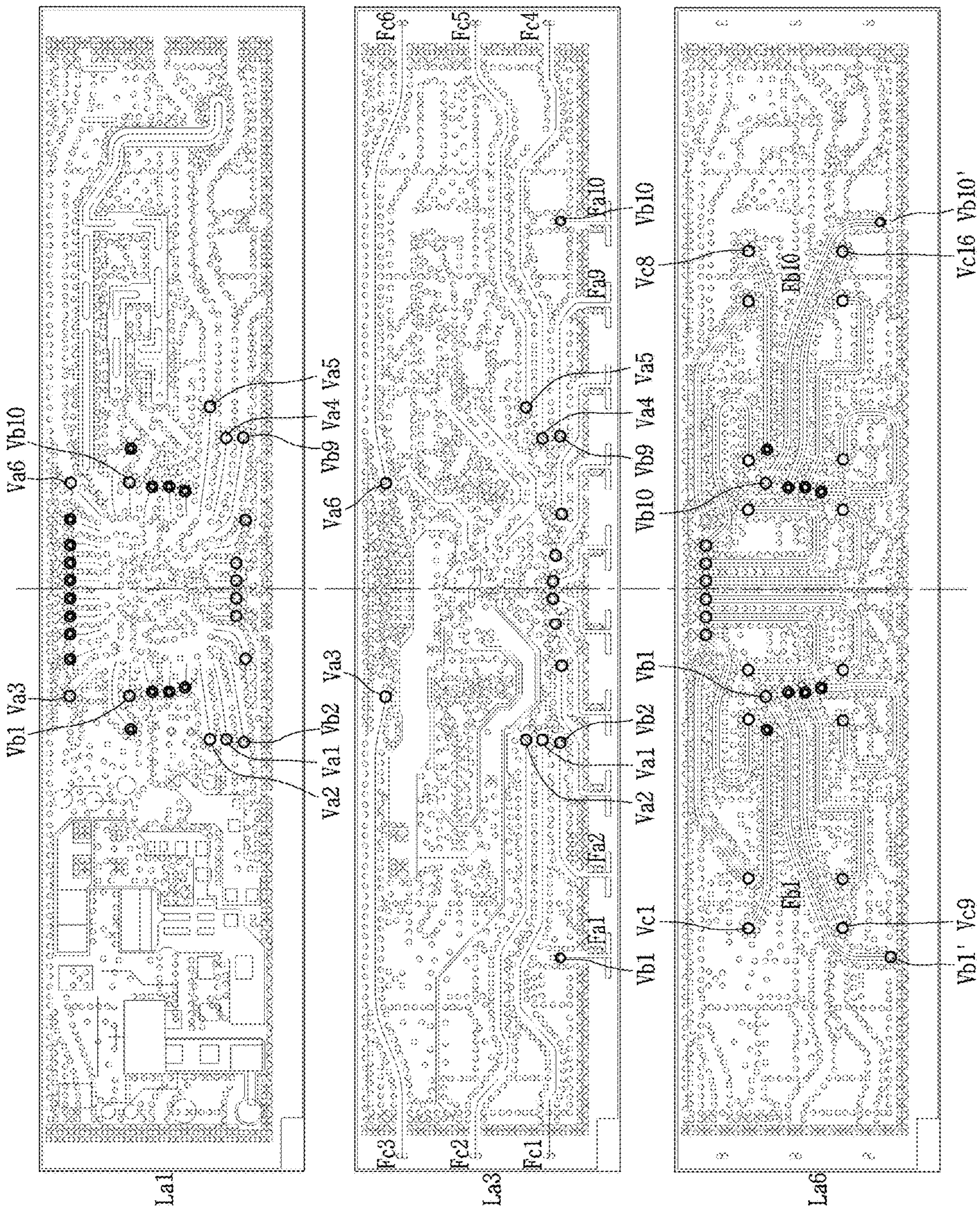
FIG. 9C shows a connection structure of feed lines of first, third, and sixth layers of FIG. 9A.

Hereinafter, a disposition structure for each layer of the antenna module according to the present disclosure will be described. In this regard, FIGS. 9A and 9B are front views illustrating the antenna module of FIG. 9 for each layer. FIG. 9C shows a connection structure of feed lines of first, third, and sixth layers of FIG. 9A.

Hereinafter, each layer of the antenna module 1000_a_ will be described in detail with reference to FIGS. 6 to 9C. The antenna module 1000_a_ may be configured by stacking layers from a first layer La1, on which the transceiver circuitry 1400_a_ is disposed, to a sixth layer La6, on which the feed lines for the first array antenna 1200_a_ are located. In addition, the antenna module 1000_a_ may further include layers from a seventh layer La7, which is a ground layer for the sixth layer La6, to a twelfth layer La12, on which antenna elements of the first array antenna 1200_a_ are disposed.

The transceiver circuitry 1400_a_ may be disposed on the first layer La1. The transceiver circuitry 1400_a_ may have a plurality of pins, and connection lines may be connected to the plurality of pins. The transceiver circuitry 1400_a_ may be disposed based on a center line of the first layer La1 in one axial direction.

The second layer La2 may include a metal layer on the central region CR, so as to be configured as a first ground layer GND1 for the first layer La1. The monopole antennas MA1 to MA6 of the third and fourth array antennas 1100_a_ and 1100_b_ may be disposed on one side region and another side region of the third layer La3. End portions of first feed lines of the monopole antennas MA1 to MA6 may be connected to lines of the first layer La1 by first type vias Val to Va6.

The dipole antennas DA1 to DA10 of the second array antenna 1300_a_ may be disposed in a bottom region of the third layer La3. End portions of second feed lines of the dipole antennas DA2 to DA9 may be connected to lines of the first layer La1 through second type vias Vb2 to Vb9.

The fourth layer La4 may include a metal layer on the central region CR, so as to be configured as a second ground layer GND2 for the third layer La3. The first and second feed lines of the third layer La3 are disposed between the first ground layer of the second layer La2 and the second ground layer of the fourth layer La4. Accordingly, the first and second feed lines of the third layer La3 constitute a first coplanar waveguide structure in which ground layers are disposed on an upper layer and a lower layer in a heightwise direction. The metal layers of the first and second ground layers may be partially removed so that the first and second type vias can be vertically connected.

The fifth layer La5 may include a metal layer on the central region CR, so as to be configured as a third ground layer GND3 for the sixth layer La6. On the sixth layer La6, third feed lines for the patch antennas PA11 to PA18 and PA21 to PA28 of the first array antenna 1200_a_ may be disposed. Distances between one end portion and another end portion of the third feed lines may be the same. The third feed lines may be connected to the lines of the first layer La1 by third type vias Vc1 to Vc8 and Vc9 to Vc16 that are formed on the one end portions of the third feed lines.

The outermost dipole antennas DA1 and DA10 of the third layer La3 may be connected through fourth feed lines of the sixth layer La6. Accordingly, the lines of the first layer La1 may be connected to the fourth feed lines of the sixth layer La6 through the second type vias Vb1 and Vb10. The fourth feed lines of the sixth layer La6 may be connected to the dipole antennas DA1 and DA10 of the third layer La3 by second type vias Vb1' and Vb10' at their another end portions.

The seventh layer La7 may include a metal layer on the central region CR, so as to be configured as a fourth ground layer GND4 for the sixth layer La6. The third and fourth feed lines of the sixth layer La6 are disposed between the third ground layer of the fifth layer La5 and the fourth ground layer of the fifth layer La5. Accordingly, the third and fourth feed lines of the sixth layer La6 constitute a second coplanar waveguide structure in which ground layers are disposed on an upper layer and a lower layer in a heightwise direction. The metal layers of the third and fourth ground layers may be partially removed so that the second and third type vias can be vertically connected.

As described above, the second, fourth, fifth, and seventh layers La2, La4, La5, and La7 may configure the first to fourth ground layers GND1 to GND4, respectively. The substrate 1010_a_ may include the first ground layer GND1 for the transceiver circuitry 1400_a_ to the fourth ground layer GND4 for the first array antenna 1200_a_. The third and fourth array antennas 1100_a_ and 1100_b_ may vertically extend from a layer between the first ground layer GND1 and the second ground layer GND2 to the upper layer of the fourth ground layer GND4.

The first array antenna 1200_a_ may be disposed on the upper layer of the fourth ground layer GND4. The second array antenna 1300_a_ may be disposed on a layer between the first ground layer GND1 and the second ground layer GND2. Accordingly, even if the same horizontal polarization is implemented through the first and second array antennas 1200_a_ and 1300_a_, mutual interference hardly occurs due to the second to fourth ground layers GND2 to GND4.

In the RFIC 1400_a_, a length of a feed pattern of the first array antenna 1200_a_ may be configured to be the same for all antenna elements. The length of the feed pattern of the first array antenna 1200_a_ may be determined as the sum of a first length L1_a_ to a fourth length L4_a_. The length of the feed pattern may be configured to be the same for all the patch antennas PA11 to PA18 and PA21 to PA28 of the third array antenna 1200. First length L1_a_ to the fourth length L4_a_ may be configured to be the same for all the patch antennas PA11 to PA18 and PA21 to PA28. Accordingly, signals applied from the RFIC 1400_a_ to all of the patch antennas PA11 to PA18 and PA21 to PA28 are in phase, and a beam can be formed toward the center point in the front direction.

First and second via pads VP1 and VP2 may be formed in eighth and ninth layers La8 to La9 to vertically connect the third type vias Vc1 to Vc8 and Vc9 to Vc16. Conductive plates CP11 to CP18 and CP21 to CP28 connected to ends of the third type vias Vc1 to Vc8 and Vc9 to Vc16 may be disposed on a tenth layer La10. The conductive plates CP11 to CP18 and CP21 to CP28 may be referred to as power feeding plates. A first gap G1 between the adjacent conductive plates CP11 and CP12 may be shorter than a second gap G2 between the adjacent conductive plates CP12 and CP13.

A metal layer forming a ground wall GW may be partially disposed on the eleventh layer La11. The conductive plates of the monopole antennas MA1 to MA6 configuring the third and fourth array antennas 1100*a* and 1100*b* may be disposed on one side region and another side region of the third layer La3 to the eleventh layer La11.

On the twelfth layer La12, the patch antennas PA11 to PA18 and PA21 to PA28 of the second array antenna 1300*a* may be disposed. Centers of the patch antennas PA11 to PA18 and PA21 to PA28 may be offset in another axis direction from the conductive plates CP11 to CP18 and CP21 to CP28. A third gap G3 between the adjacent patch antennas PA11 and PA12 may be formed to be longer than the first gap G1 and shorter than the second gap G2.

Figure 10:
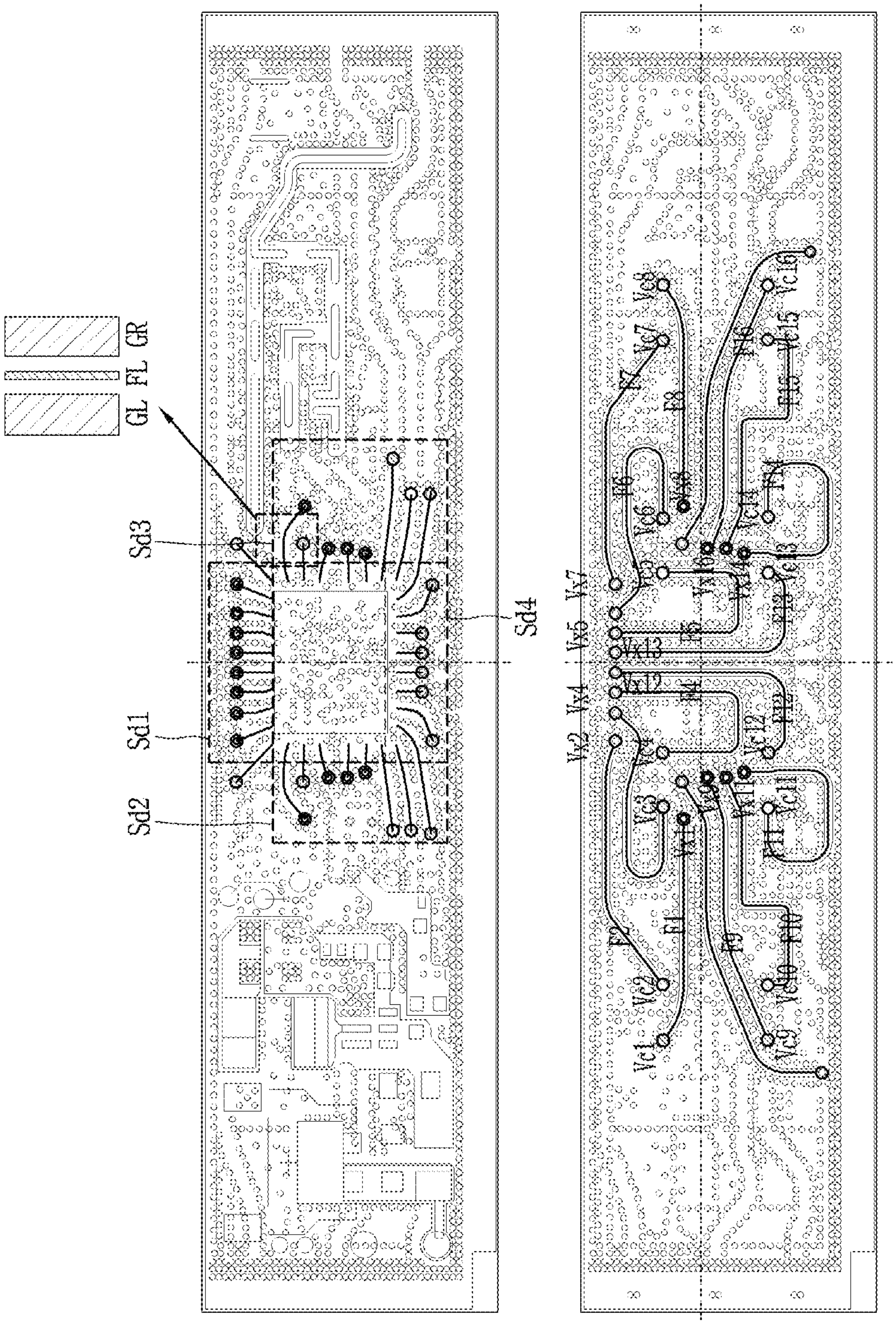
FIG. 10 is an enlarged view of first and sixth layers among the plurality of layers of the PCB of FIG. 9A.
Figure 11:
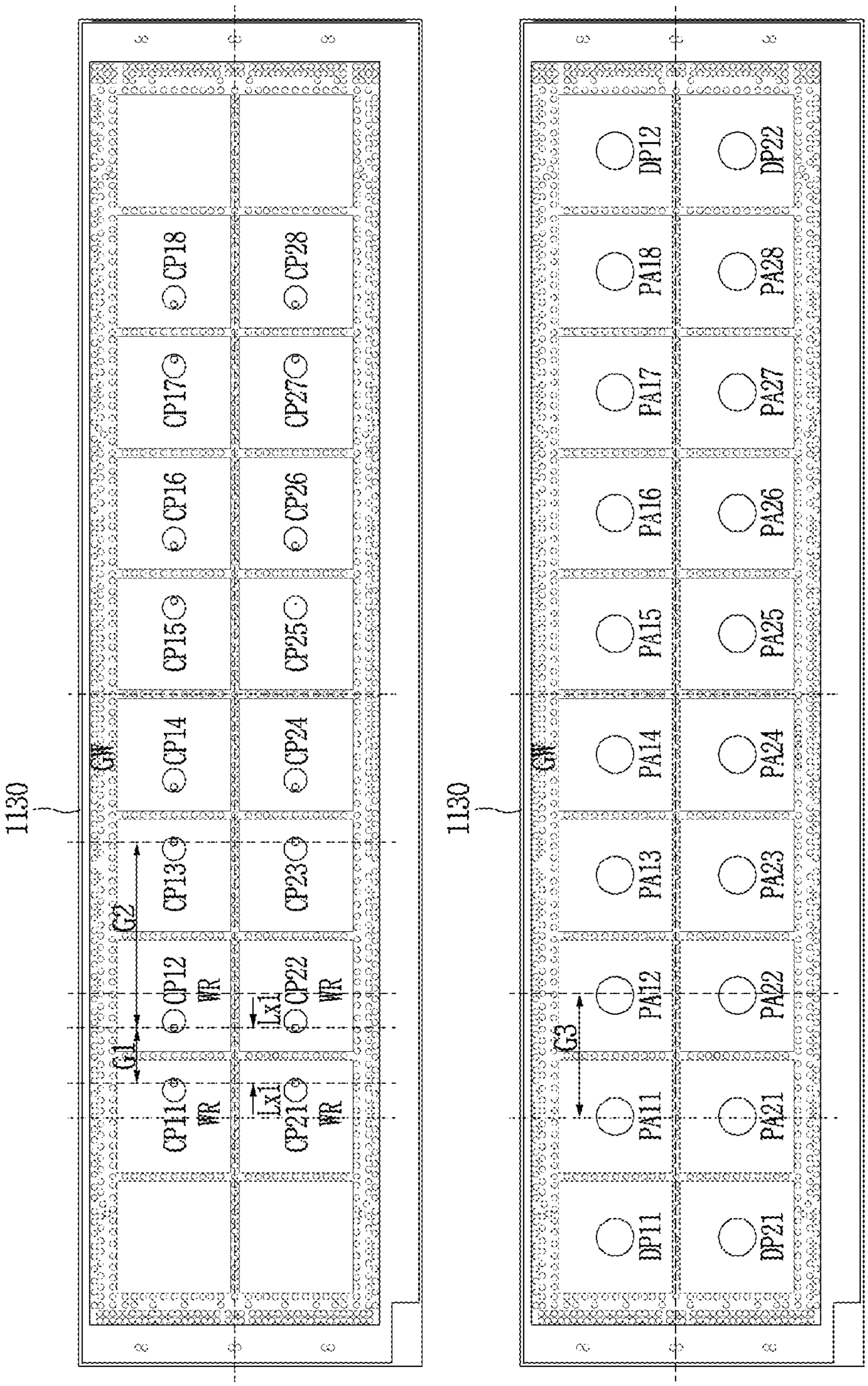
FIG. 11 is an enlarged view of tenth and twelfth layers among the plurality of layers of the PCB of FIG. 9B.

Hereinafter, a feeding structure for each layer of a first array antenna that performs front surface radiation in an antenna module implemented as a multi-layered antenna package according to the present disclosure will be described in detail. In this regard, FIG. 10 is an enlarged view of first and sixth layers among the plurality of layers of the PCB of FIG. 9A. FIG. 11 is an enlarged view of tenth and twelfth layers among the plurality of layers of the PCB of FIG. 9B.

Referring to FIGS. 7 to 11, signal connection lines (feed lines) of the first layer La1 and the sixth layer La6 may be formed in a coplanar waveguide structure. The signal connection lines of the first layer La1 and the sixth layer La6 may be disposed as feed lines FL on a central portion of the coplanar waveguide structure. In the coplanar waveguide structure of the first layer La1 and the sixth layer La6, ground regions GL and GR may be disposed at one side and another side of the feed lines FL on the central portion. A plurality of ground vias may be disposed in the ground regions GL and GR to be connected to ground regions of other layers. Boundaries on one side and another side of the coplanar waveguide structure may be spaced apart from boundaries of the ground regions GL and GR by predetermined distances.

The RFIC 1400*a* may be disposed on a central portion of the first layer La1. The plurality of pins of the RFIC 1400*a* may be connected to feed lines of a first side Sd1 as a top region, feed lines of a second side Sd2 as one side region, feed lines of a third side Sd3 as another side region, and feed lines of a fourth side Sd4 as a bottom region.

End portions Vc1 to Vc8 of first to eighth feed lines F1 to F8 may be disposed in the top region with respect to a central axis of the PCB 1010*a*. End portions Vc9 to Vc16 of ninth to sixteenth feed lines F9 to F16 may be disposed in the bottom region with respect to the central axis of the PCB 1010*a*.

The first to third feed lines F1, F2, and F3 of the sixth layer La6 are formed in a structure disposed in the top (left) region of the PCB 1010*a*. The fourth feed line F4 of the sixth layer La6 is formed in a structure connected from the top region back to the top region via the bottom region. A portion of the fourth feed line F4 is disposed at a position overlapping the inside of the RFIC 1400*a*.

The ninth to eleventh feed lines F9, F10, and F11 of the sixth layer La6 are formed in a structure disposed in the bottom (left) region of the PCB 1010*a*. The twelfth feed line F12 of the sixth layer La6 is formed in a structure connected from the top region to the bottom region of the PCB 1010*a*. One end portion Vx12 of the twelfth feed line F12 is disposed in the top region and another end portion Vc12 is disposed in the bottom region. A portion of the twelfth feed line F12 is disposed at a position overlapping the inside of the RFIC 1400*a*.

The sixth to eighth feed lines F6, F7, and F8 of the sixth layer La6 are formed in a structure disposed in the top (right) region of the PCB 1010*a*. The fifth feed line F5 of the sixth layer La6 is formed in a structure connected from the top region back to the top region via the bottom region. A portion of the fifth feed line F5 is disposed at a position overlapping the inside of the RFIC 1400*a*.

The fourteenth to sixteenth feed lines F14, F15, and F16 of the sixth layer La6 are formed in a structure disposed in the bottom (right) region of the PCB 1010*a*. The thirteenth feed line F13 of the sixth layer La6 is formed in a structure connected from the top region to the bottom region of the PCB 1010*a*. One end portion Vx13 of the thirteenth feed line F13 is disposed in the top region and another end portion Vc13 is disposed in the bottom region. A portion of the thirteenth feed line F13 is disposed at a position overlapping the inside of the RFIC 1400*a*.

End portions of the feed lines at the first side Sd1 of the first layer La1 may be connected to end portions Vx2, Vx3, Vx4, Vx12, Vx13, Vx5, Vx6, and Vx7 of the feed lines F2, F3, F4, F12, F13, F5, F6, and F7 of the sixth layer La6 through the vertical vias. End portions of the feed lines at the second side Sd2 of the first layer La1 may be connected to end portions Vx1, Vx9, and Vx10, and Vx11 of the feed lines F1, F9, F10, and F11 of the sixth layer La6 through the vertical vias. End portions of the feed lines at the third side Sd3 of the first layer La1 may be connected to end portions Vx8, Vx14, Vx15, and Vx16 of the feed lines F8, F14, F15, and F16 of the sixth layer La6 through the vertical vias.

The feed lines F1 to F16 for all antenna elements constituting the first array antenna 1200*a* may be formed to have the same length on the sixth layer La6. Ground layers on which vias are formed are disposed at one side and another side of the feed lines F1 to F16. Accordingly, the sixth layer La6 on which the feed lines F1 to F16 are formed is configured as a coplanar waveguide layer.

Center positions of another end portions Vc1 to Vc16 of the feed lines F1 to F16 for all antenna elements constituting the first array antenna 1200*a* correspond to feeding points for all the antenna elements through the vertical vias. In this regard, FIG. 9 is an enlarged view of the tenth and twelfth layers, on which the first and second patch elements are disposed, among the plurality of layers of FIG. 6B.

The feed lines F1 to F16 for all the antenna elements constituting the first array antenna 1200*a* may be formed in a symmetrical structure with respect to an Y axis as a vertical axis. The first and eighth feed lines F1 and F8 may be formed in a symmetrical structure with respect to the Y axis. A plurality of regions of the first and eighth feed lines F1 and F8 are formed as straight lines parallel to an X axis. Considering a coordinate difference in the vertical axis between the one end portions Vx1 and Vx8 and the another end portions Vc1 and Vc8 of the first and eighth feed lines F1 and F8, partial regions of end points of the first and eighth feed lines F1 and F8 may be formed with a curved portion and an inclined straight line.

The second and seventh feed lines F2 and F7 may be formed in a symmetrical structure with respect to the Y axis. A plurality of regions of the second and seventh feed lines F2 and F7 are formed as straight lines parallel to the X axis. Considering a coordinate difference in the vertical axis between the one end portions Vx2 and Vx7 and the another end portions Vc2 and Vc7 of the second and seventh lines F2 and F7, partial regions of end points of the second and seventh feed lines F2 and F7 may be formed with a curved portion and an inclined straight line. The first and eighth feed lines F1 and F8 may have the same length and also the second and seventh feed lines F2 and F7 may have the same length.

The third and sixth feed lines F3 and F6 may be formed in a symmetrical structure with respect to the Y axis. The third and sixth feed lines F3 and F6 may include two straight lines parallel to the X axis. A distance between the two straight lines of each of the third and sixth feed lines F3 and F6 may be ¼ or more of a wavelength corresponding to an operating frequency, so that mutual interference can be maintained below a predetermined level. The first and eighth feed lines F1 and F8 may have the same length, the second and seventh feed lines F2 and F7 may have the same length, and the third and sixth feed lines F3 and F6 may have the same length.

The fourth and fifth feed lines F4 and F5 may be formed in a symmetrical structure with respect to the Y axis. The fourth and fifth feed lines F4 and F5 may include two straight lines parallel to the Y axis. A distance between the two straight lines of each of the fourth and fifth feed lines F4 and F5 may be ¼ or more of a wavelength corresponding to an operating frequency, so that mutual interference can be maintained below a predetermined level. The first and eighth feed lines F1 and F8, the second and seventh feed lines F2 and F7, the third and sixth feed lines F4 and F5, and the fourth and fifth feed lines F4 and F5 may have the same length, respectively.

The ninth and sixteenth feed lines F9 and F16 may be formed in a symmetrical structure with respect to the Y axis. The ninth and sixteenth feed lines F9 and F16 each may include a straight line parallel to the X axis, a straight line inclined upward, and a straight line inclined downward.

The tenth and fifteenth feed lines F10 and F15 may be formed in a symmetrical structure with respect to the Y axis. The tenth and fifteenth feed lines F10 and F15 each may include a straight line parallel to the X axis, a straight line inclined upward, and two straight lines parallel to the Y axis. A distance between the two straight lines of each of the tenth and fifteenth feed lines F10 and F15 may be ¼ or more of a wavelength corresponding to an operating frequency, so that mutual interference can be maintained below a predetermined level. The ninth and sixteenth feed lines F9 and F16 may have the same length and also the tenth and fifteenth feed lines F10 and F15 may have the same length.

The eleventh and fourteenth feed lines F11 and F14 may be formed in a symmetrical structure with respect to the Y axis. The eleventh and fourteenth feed lines F11 and F14 each may include two straight lines parallel to the X axis, and two straight lines parallel to the Y axis. A distance between the two straight lines of each of the eleventh and fourteenth feed lines F11 and F14 may be ¼ or more of a wavelength corresponding to an operating frequency, so that mutual interference can be maintained below a predetermined level. The ninth and sixteenth feed lines F9 and F16 may have the same length, the tenth and fifteenth feed lines F10 and F15 may have the same length, and the eleventh and fourteenth feed lines F11 and F14 may have the same length.

The twelfth and thirteenth feed lines F12 and F13 may be formed in a symmetrical structure with respect to the Y axis. The twelfth and thirteenth feed lines F12 and F13 each may include a straight line parallel to the X axis, and a straight line parallel to the Y axis. The ninth and sixteenth feed lines F9 and F16, the tenth and fifteenth feed lines F10 and F15, the eleventh and fourteenth feed lines F11 and F14, and the twelfth and thirteenth feed lines F12 and F13 may have the same length, respectively.

In addition, the first to eighth feed lines F1 to F8 in the top region based on the X axis of the sixth layer La6 and the ninth to sixteenth feed lines F9 to F16 in the bottom region based on the X axis of the sixth layer La6 may all be formed in the same way. This can suppress a beam direction from being changed or beam quality from being degraded due to a phase difference applied to each antenna element, which is caused by a difference in length of the feed lines for each layer.

The tenth layer La10 may include a plurality of first patch elements CP11 to CP18 and CP21 to CP28. Among the plurality of first patch elements, the patch elements CP11 and CP12 adjacent to each other in one axial direction may be spaced apart from each other by a first gap G1. Among the plurality of first patch elements, the patch elements CP12 and CP13 adjacent to each other in the one axial direction may be spaced apart from each other by a second gap G2.

The twelfth layer La12 may include a plurality of second patch elements PA11 to PA18 and PA21 to PA28. Among the plurality of second patch elements PA11 to PA18 and PA21 to PA28, the adjacent patch elements may be disposed to be spaced apart from each other equally by a third gap G3 in the one axial direction.

In this regard, the first patch elements CP11 and CP21 in a first row may be disposed to be offset by a first distance Lx1 in a positive axial direction from a center of a window region WR within the ground wall 1130. Meanwhile, the first patch elements CP12 and CP22 in a second row may be disposed to be offset by the first distance Lx1 in a negative axial direction from the center of the window region WR within the ground wall 1130. The first distance Lx1 may be determined as (G3−G1)/2.

The first patch elements CP13, CP15, CP17, CP23, CP25, and CP27 in third, fifth, and seventh rows may be disposed to be offset by the first distance Lx1 in the positive axial direction from the center of the window region WR within the ground wall 1130. On the other hand, the first patch elements CP14, CP16, CP18, CP23, CP26, and CP28 in fourth, sixth, and eighth rows may be disposed to be offset by the first distance Lx1 in the positive axial direction from the center of the window area WR within the ground wall 1130. The first distance Lx1 may be determined as (G3−G1)/2.

Feeding point Vc1 to Vc16 of the feed lines F1 to F16 for all the antenna elements constituting the first array antenna 1100*a* correspond to feeding positions of the first patch elements CP11 to CP18 and CP21 to CP28. Accordingly, the feeding points Vc1 to Vc16 of the feed lines F1 to F16 are vertically connected through the vertical vias to points that are offset from the centers of the first patch elements CP11 to CP18 and CP21 to CP28.

Therefore, the feeding positions of the first patch elements CP11 to CP18 and CP21 to CP28 are defined as the points offset from the centers of the first patch elements CP11 to CP18 and CP21 to CP28 according to the feeding points Vc1 to Vc16 determined for impedance matching.

Center positions of another end portions Vc1 to Vc16 of the feed lines F1 to F16 for all the antenna elements constituting the first array antenna 1200*a* correspond to center positions of the feeding points for all the antenna elements through the vertical vias.

Hereinafter, a multi-layered antenna package according to the present disclosure will be described with reference to FIGS. 1 to 11. The antenna module 1000 may include a PCB 1010*a*, a phased array antenna portion 1200, an RFIC 1400*a*, and a plurality of signal connection lines SL1 to SLA.

The PCB 1010*a* may include a plurality of layers. The plurality of layers may include a plurality of metal surfaces and dielectric layers. The plurality of metal surfaces may be stacked with the dielectric layers interposed therebetween to be electrically separated from one another.

The phased array antenna portion 1200*a* may include a plurality of antenna elements PA11 to PA18 and PA21 to PA28 disposed on the PCB 1010*a*. Each of the plurality of antenna elements PA11 to PA18 and PA21 to PA28 may be configured to radiate a radio signal. Each of the plurality of antenna elements, as illustrated in (b) of FIG. 7, may have a patch antenna structure including at least two patch antennas 1210 and 1220. As another embodiment, the phased array antenna portion 1200*a* may have a patch antenna structure including the patch antenna 1200, as illustrated in (c) of FIG. 7.

Referring to (b) of FIG. 7, the first patch antenna 1220 of the two patch antennas may be disposed on a first surface S1 of the PCB 1010*a*, and the first surface S1 may be the outermost surface of the PCB 1010*a*. Among the two patch antennas, the second patch antenna 1210 may be disposed inside the PCB 1010*a*. A portion of the first patch antenna 1220 and a portion of the second patch antenna 1210 may be stacked to overlap each other.

Referring to (c) of FIG. 7, the patch antenna 1210*b* may be disposed on the first surface S1 of the PCB 1010*a*, and the first surface S1 may be the outermost surface of the PCB 1010*a*.

Referring to FIGS. 1 to 11, the RFIC 1400*a* may be disposed on a second surface S2. The second surface S2 may be another outermost surface of the PCB 1010*a*.

Each of the plurality of signal connection lines may be configured to connect the RFIC 1400*a* to the phased array antenna portion 1200*a*. Radio signals may be transferred between the phased array antenna portion 1200*a* and the RFIC 1400*a* by the plurality of signal connection lines SL1 to SL4. Each of the plurality of signal connection lines SL1 to SL4 may be fed by being connected to the second patch antenna 1210 inside the PCB 1010*a*. Each of the plurality of signal connection lines SL1 to SL4 may be configured not to be directly connected to the first patch antenna 1220 on the first surface S1 of the PCB 1010*a*. A length of each of the plurality of signal connection lines SL1 to SLA is defined as a length of a connection line connected between the RFIC 1400*a* and the phased array antenna portion 1200*a*. The plurality of signal connection lines may be formed to have the same length.

The plurality of signal connection lines SL1 to SL4 may be disposed between the phased array antenna portion 1200*a* and the RFIC 1400*a* inside the PCB 1010*a*. The plurality of signal connection lines SL1 to SL4 may include coplanar waveguide layers. Each of the coplanar waveguide layers may be disposed on a conductive plate between two ground conductive plates inside the PCB 1010*a*.

The conductive plate of the coplanar waveguide layer may include a plurality of signal connection lines SL1 to SLA and ground portions. The plurality of signal connection lines and ground portions may be disposed on the same conductive plate between the two ground conductive plates inside the PCB 1010*a*.

Each of the plurality of signal connection lines SL1 to SL4 may include a first part SL1, a second part SL2, a third part SL3, and a fourth part SLA. The first part SL1 may be disposed on the second surface S2 of the PCB 1010*a*. The third part SL3 may be configured to have a coplanar waveguide structure WG2. The second part SL2 may be configured to electrically connect the first part SL1 and the third part SL3. The fourth part SL4 may be configured to electrically connect the third part SL3 and one of the second patch antennas 1210.

A first ground region 1100*g* configured as a metal surface may be defined between the coplanar waveguide structure WG2 and the RFIC chip 1400*a*. A second ground region 1200*g* may be defined between the coplanar waveguide structure WG2 and the second patch antenna 1210.

The PCB 1010*a* may include first to sixth layers La1 to La6. The first parts SL1 of the signal connection lines may be disposed on the first layer La1 of the PCB 1010*a*. The second parts SL2 of the signal connection lines may be formed by first vertical vias from the first layer La1 to the sixth layer La6 of the PCB 1010*a*. The third parts SL3 of the signal connection lines may be formed by second vertical vias from the sixth layer La6 to the second patch antennas CP11 to CP18 and CP21 to CP28.

For the plurality of antenna elements PA11 to PA18 and PA21 to PA28, the first parts SL1 of the signal connection lines on the first layer La1 may have the same length. For the plurality of antenna elements PA11 to PA18 and PA21 to PA28, the fourth parts SLA of the signal connection lines on the sixth layer La6 may have the same length.

For the plurality of antenna elements PA11 to PA18 and PA21 to PA28, the first vertical vias corresponding to the second parts SL2 may all have the same length (height). End points of the first vertical vias on the sixth layer La6 are represented as Vx1 to Vx16. For the plurality of antenna elements PA11 to PA18 and PA21 to PA28, the second vertical vias corresponding to the fourth parts SLA may all have the same length (height). Start points of the second vertical vias on the sixth layer La6 are represented as Vc1 to Vc16. The feed lines F1 to F16 on the sixth layer La6 may all have the same feeding length.

Some F3, F4, F5, and F6 of the upper feed lines may be configured as two parallel lines spaced apart from each other by a predetermined gap or more, so as to have the same length as the other feed lines. Some F10, F11, F12, F13, F14, and F15 of the lower feed lines may also be configured as two parallel lines spaced apart from each other by a predetermined gap or more, so as to have the same length as the other feed lines. The gap between the two parallel lines may be ¼ or more of a wavelength corresponding to an operating frequency, so that interference between the lines can be reduced to a predetermined level or less. This is because when the two parallel lines are spaced by less than ¼ of the wavelength, an effective electrical length may decrease due to the interference between the lines.

An in-phase signal may be applied to each of the plurality of antenna elements PA11 to PA18 and PA21 to PA28 on each layer of the PCB 1010*a* by the same feeding length. This can suppress deterioration in beam quality due to a phase error of an applied signal between the respective antenna elements.

The feed lines of the first layer La may be connected to the feed lines of the sixth layer La6 through the first vertical vias passing through the first and second ground layers. The feed lines of the sixth layer La6 may be connected to the second patch antennas CP11 to CP18 and CP21 to CP28. The feed lines of the sixth layer La6 may be formed to have the same length.

The phased array antenna portion 1200*a* may include a first array antenna portion 1250*a* and a second array antenna portion 1300*a*. In the first array antenna portion 1250*a*, eight first patch antennas PA11 to PA18 and eight second patch antennas CP11 to CP18 may be disposed in a first column in the X-axial direction. In the second array antenna portion 1250*b*, eight first patch antennas PA21 to PA28 and eight second patch antennas CP21 to CP28 may be disposed in a second column in the X-axial direction. The phased array antenna portion 1200*a* may be implemented as a 2×8 array antenna.

The first parts SL of the plurality of signal connection lines may be connected to pins of a first side Sd1, a second side Sd2, and a fourth side Sd4 of the RFIC 1400*a*. The first side Sd1 may be a top region of the RFIC 1400*a*. The second side Sd2 may be one side region of the RFIC 1400*a*. The fourth side Sd4 may be another side region of the RFIC 1400*a*.

The first parts SL1 of the plurality of signal connection lines disposed on the first layer La1 may be formed in a symmetrical structure with respect to the center of the Y axis of the PCB 1010*a*. The third parts SL3 of the plurality of signal connection lines disposed on the sixth layer La6 may be formed in a symmetrical structure with respect to the center of the Y axis of the PCB 1010*a*.

The first array antenna portion 1250*a* may be disposed on an upper portion based on the X axis. The second array antenna portion 1250*b* may be disposed on a lower portion based on the X axis. Beamforming may be performed in an upward direction or a downward direction with respect to the center of the front surface based on a phase difference between signals applied between the first array antenna portion 1250*a* and the second array antenna portion 1250*b*. In FIG. 6, when an obstacle is placed between the communication device 100 disposed on a front region and the electronic device 200, beamforming can be performed in the upward direction from the center of the front surface, which can allow for contents transmission using signals reflected through a ceiling.

The first patch CP11 of the first array antenna portion 1250*a* may be connected to the second side Sd2 of the RFIC 1400*a* through the feed line F1. The second patch CP12 of the first array antenna portion 1250*a* may be connected to the first side Sd1 of the RFIC 1400*a* through the feed line F2. The third patch CP13 of the first array antenna portion 1250*a* may be connected to the first side Sd1 of the RFIC 1400*a* through the feed line F3. The fourth patch CP14 of the first array antenna portion 1250*a* may be connected to the first side Sd1 of the RFIC 1400*a* through the feed line F4. The first patch CP11 to the fourth patch CP14 may be sequentially disposed on an upper left portion of the PCB 1010*a*. The feed lines F1 to F4 of the first patch CP11 to the fourth patch CP14 may be disposed on the upper left portion of the PCB 1010*a* and may all have the same length.

The fifth patch CP15 of the first array antenna portion 1250*a* may be connected to the first side Sd1 of the RFIC 1400*a* through the feed line F5. The sixth patch CP16 of the first array antenna portion 1250*a* may be connected to the first side Sd1 of the RFIC 1400*a* through the feed line F6. The seventh patch CP17 of the first array antenna portion 1250*a* may be connected to the first side Sd1 of the RFIC 1400*a* through the feed line F7. The eighth patch CP18 of the first array antenna portion 1250*a* may be connected to the fourth side Sd4 of the RFIC 1400*a* through the feed line F7. The fifth patch CP15 to the eighth patch CP18 may be sequentially disposed on an upper right portion of the PCB 1010*a*. The feed lines F5 to F8 of the fifth patch CP15 to the eighth patch CP18 may be disposed on the upper right portion of the PCB 1010*a* and may all have the same length.

Spaced distances between adjacent antenna elements of the array antenna portion 1200*a* may be different. The adjacent antenna elements of the phased array antenna portion 1200*a* may be disposed to be alternately offset in one direction and another direction on the X axis. A first gap G1 between the feeding point of the first patch CP11 and the feeding point of the second patch CP12 may be shorter than a second gap G2 between the feeding point of the second patch CP12 and the feeding point of the third patch CP13.

The first patch CP21 of the second array antenna portion 1250*b* may be connected to the second side Sd2 of the RFIC 1400*a* through the feed line F9. The second patch CP22 of the second array antenna portion 1250*b* may be connected to the second side Sd2 of the RFIC 1400*a* through the feed line F10. The third patch CP23 of the second array antenna portion 1250*b* may be connected to the second side Sd2 of the RFIC 1400*a* through the feed line F11. The fourth patch CP24 of the second array antenna portion 1250*b* may be connected to the first side Sd1 of the RFIC 1400*a* through the feed line F12. The first patch CP21 to the fourth patch CP24 may be sequentially disposed on a lower left portion of the PCB 1010*a*. The feed lines F9 to F12 of the first patch CP21 to the eighth patch CP24 may be disposed on the upper right portion of the PCB 1010*a* and may all have the same length.

The fifth patch CP25 of the second array antenna portion 1250*b* may be connected to the first side Sd1 of the RFIC 1400*a* through the feed line F13. The sixth patch CP26 of the second array antenna portion 1250*b* may be connected to the fourth side Sd4 of the RFIC 1400*a* through the feed line F14. The seventh patch CP27 of the second array antenna portion 1250*b* may be connected to the fourth side Sd4 of the RFIC 1400*a* through the feed line F15. The eighth patch CP28 of the second array antenna portion 1250*b* may be connected to the fourth side Sd4 of the RFIC 1400*a* through the feed line F16. The fifth patch CP25 to the eighth patch CP28 may be sequentially disposed on a lower right portion of the PCB 1010*a*. The feed lines F5 to F8 of the fifth patch CP25 to the eighth patch CP28 may be disposed on the lower right portion of the PCB 1010*a* and may all have the same length.

Spaced distances between adjacent antenna elements of the array antenna portion 1200*a* may be different. The adjacent antenna elements of the phased array antenna portion 1200*a* may be disposed to be alternately offset in one direction and another direction on the X axis. A first gap G1 between the feeding point of the first patch CP21 and the feeding point of the second patch CP22 may be shorter than a second gap G2 between the feeding point of the second patch CP22 and the feeding point of the third patch CP23.

Figure 12A:
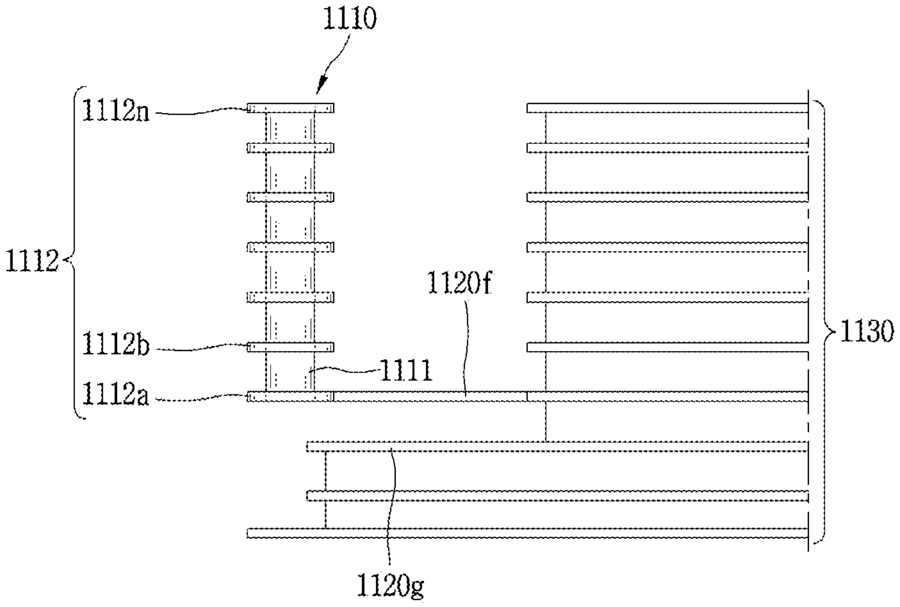
FIGS. 12A and 12B are sectional and side views illustrating a monopole antenna according to the present disclosure.
Figure 12B:
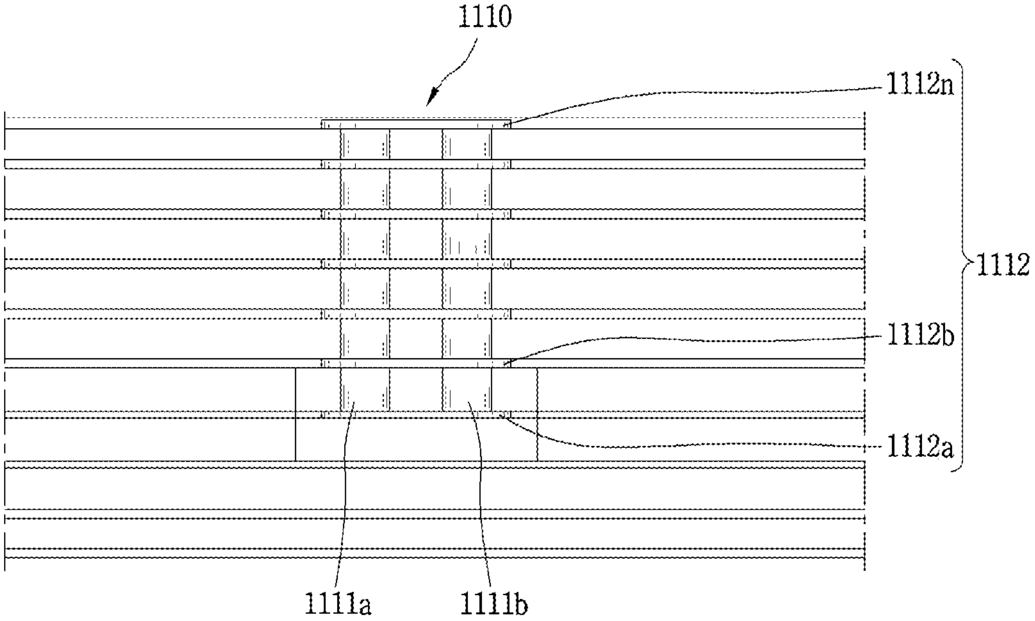
Figure 13:
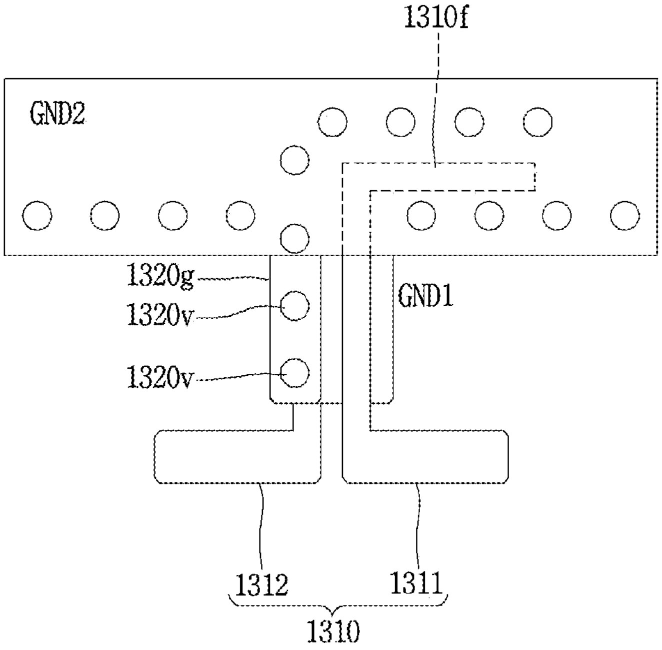
FIG. 13 is a front view illustrating a dipole antenna according to the present disclosure.

Hereinafter, monopole antennas and dipole antennas constituting an array antenna according to the present disclosure will be described in detail. In this regard, FIGS. 12A and 12B are sectional and side views of a monopole antenna according to the present disclosure. FIG. 13 is a front view illustrating a dipole antenna according to the present disclosure.

Referring to FIGS. 12A and 12B, a monopole antenna 1110 includes via pads 1112 disposed in a plurality of layers and vias 1111 connecting the via pads 1112. The vias 1111 may include first vias 1111*a* and second vias 1111*b* disposed parallel to the first vias 1111*a* in a lateral direction.

The via pads 1112 may include via pads 1112*a* to 1112*n* disposed on n different layers. Referring to FIGS. 7 to 12B, via pads may be connected to 9 layers of the third layer La3 to the 11th layer La11 by 8 vias, but may not be limited thereto, and may vary depending on applications. First and second vias 1111*a* and 1111*b* and the via pads 1112 are structurally configured to have inductance and capacitance. Therefore, an antenna operating frequency is lowered and a bandwidth is widened by an LC tank structure, so that the antenna can be miniaturized.

The antenna module 1000*a* may further include a via wall structure 1130 spaced apart by a predetermined distance in an inward direction of the substrate 1010*a*. The via wall structure 1130 may be disposed to include a plurality of vertical vias by which a plurality of pads are vertically connected to one another at a plurality of points. The via wall structure 1130 may be configured as a ground via wall electrically connected to the ground of the multi-layer substrate 1010*a*. The via wall structure 1130 may configure a ground structure and operate as a reflector for signals radiated from the monopole antenna 1110. According to another embodiment, the via wall structure 1130 may be configured as a floating via wall that is not electrically connected to the ground of the substrate 1010*a*.

A feed line 1120*f* connected to the monopole antenna 1110 is configured to feed a signal to the monopole antenna 1110. A ground layer 1120*g* may be disposed on a lower layer of the feed line 1120*f*. Accordingly, the feed line 1120*f* may be formed in a microstrip line structure. As another example, a ground layer may be further disposed on an upper layer of the feed line 1120*f* to constitute a strip line structure (or a coplanar waveguide structure).

Referring to FIG. 13, a feed pattern 1310*f* feeding the dipole antenna 1310 may be disposed between the first ground layer GND1 and the second ground layer GND2. The first ground layer GND1 and the second ground layer GND2 may be connected by a plurality of vias.

The dipole antenna 1310 may include a first conductive pattern 1311 and a second conductive pattern 1312. The first conductive pattern 1311 may be connected to the inner feed pattern 1310*f* without being connected to ground patterns. The second conductive pattern 1312 may be connected to the first ground layer GND1 through a via 1320*v*. The second conductive pattern 1212 may be connected to the ground pattern 1320*g* of the second ground layer GND2 through the via 1320*v*. The via 1310*v* may pass through the plurality of layers to connect the first ground layer GND1, the first conductive pattern 1211, and the second ground layer GND2.

The feed pattern 1310*f* may have a strip line structure (or a coplanar waveguide structure) by disposing the first and second ground layers GND1 and GND2 on the upper and lower layers. Referring to FIGS. 9A and 11, the dipole antenna 1310 may be disposed on the third layer La3. The first ground layer GND1 may correspond to the first ground layer of the second layer La2. The second ground layer GND2 may correspond to the second ground layer of the fourth layer La4.

Referring to FIGS. 6, 12A, and 12B, the monopole antenna 1110 may form a radiation pattern in the lateral direction of the substrate 1010*a* so as to transmit and receive signals in the lateral direction of the substrate 1010*a*. Meanwhile, referring to FIGS. 6 and 13, the dipole antenna 1310 may form a radiation pattern in a bottom direction of the substrate 1010*a* so as to transmit and receive signals in the bottom direction of the substrate 1010*a*.

Figure 14:
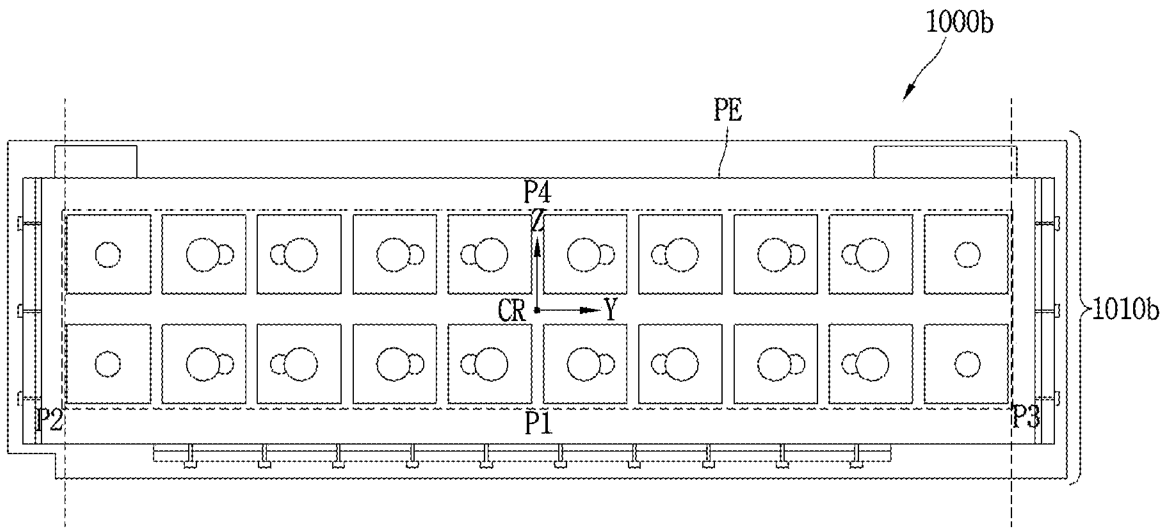
FIGS. 14 and 15 are front and sectional views illustrating a substrate having an antenna module that may be disposed on another side of an electronic device.
Figure 14:
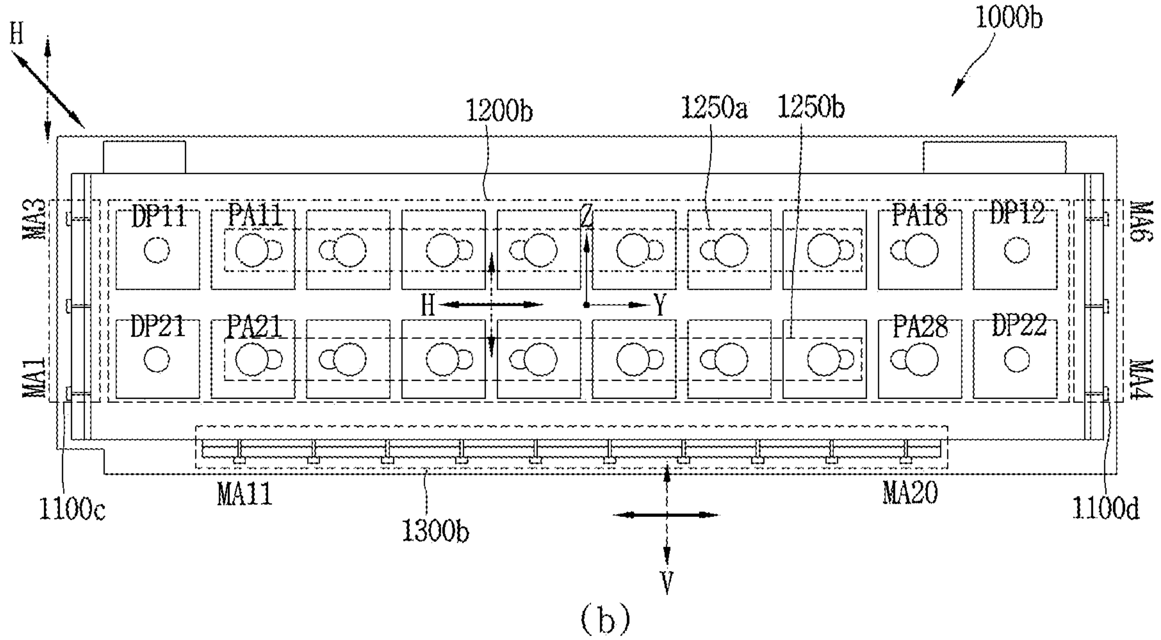
Figure 15:
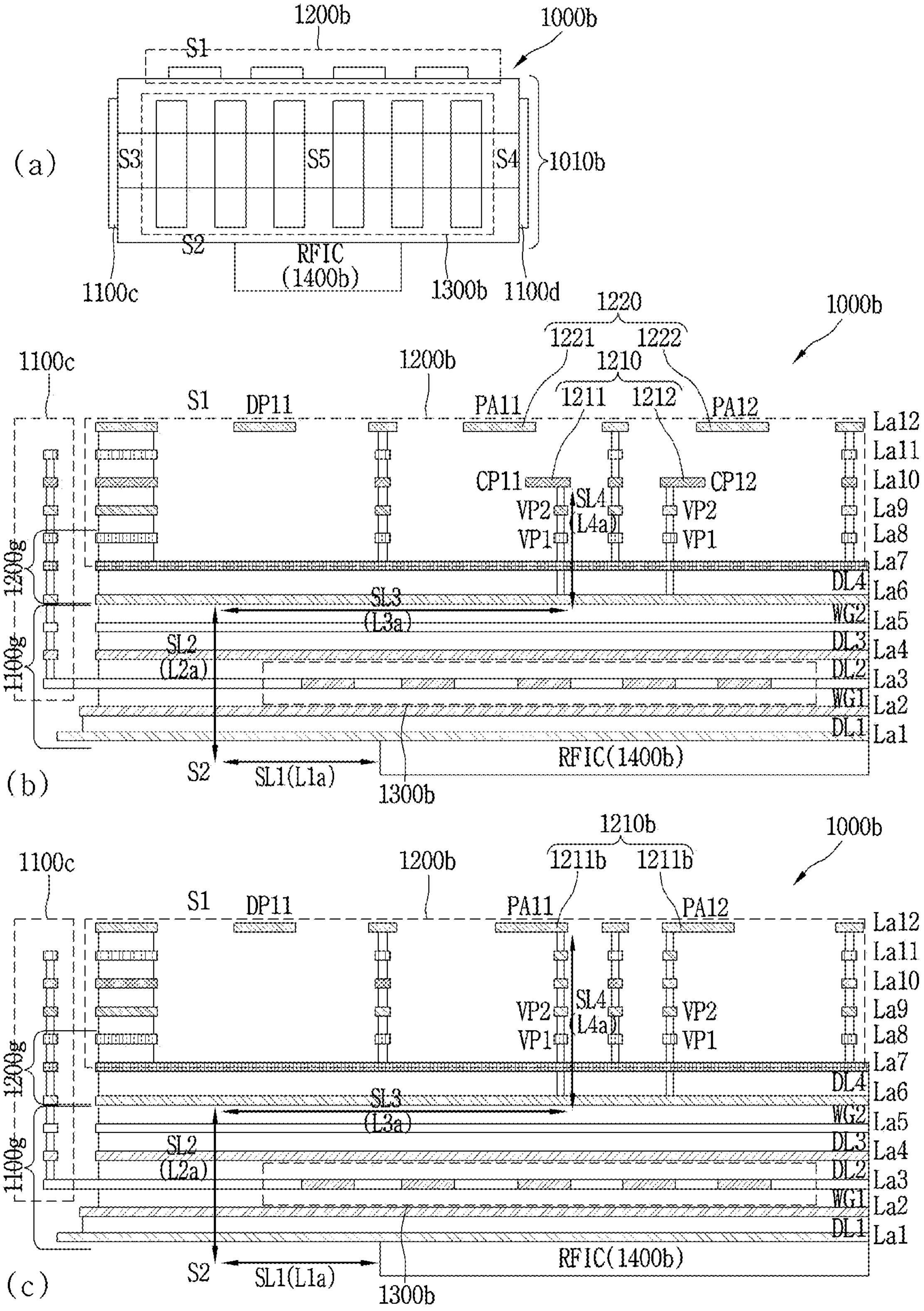
Figure 16:
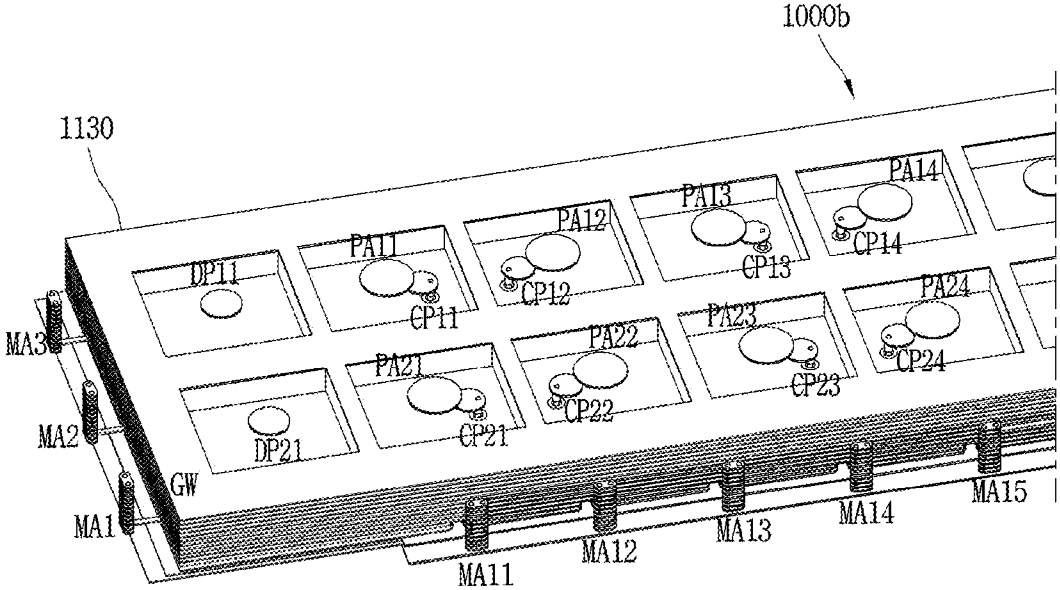
FIG. 16 shows a perspective view of the antenna module of FIG. 14 and an enlarged view of a partial area.
Figure 16:
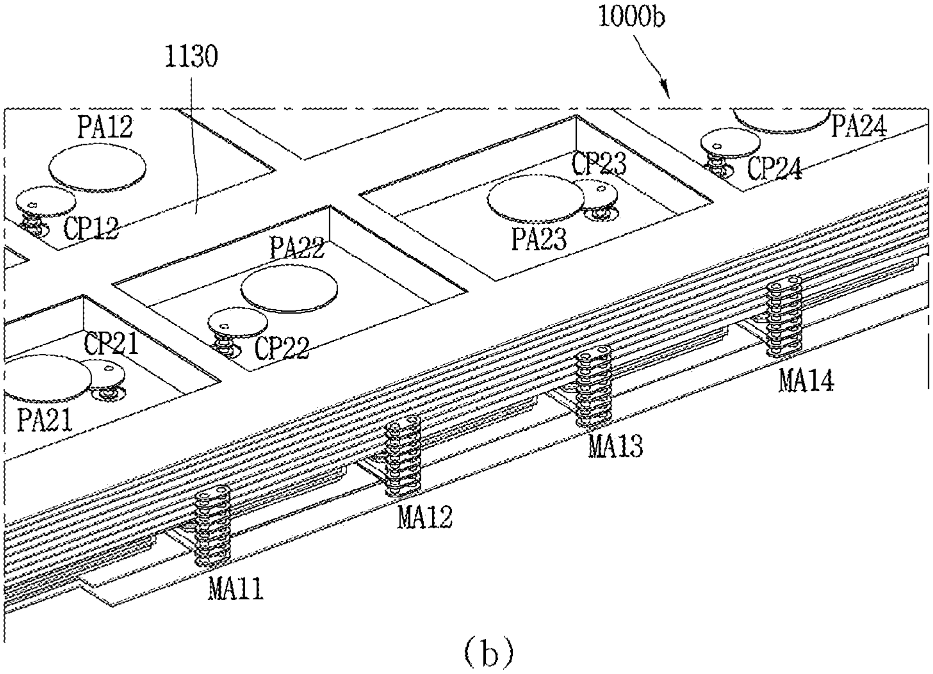

Meanwhile, at least one of the plurality of array antennas of the antenna module that may be disposed in the another side region of the electronic device according to the present disclosure may be implemented as a vertically polarized antenna. In this regard, FIGS. 14 and 15 are front and sectional views illustrating a substrate having an antenna module that may be disposed on another side of an electronic device. FIG. 16 shows a perspective view of the antenna module of FIG. 14 and an enlarged view of a partial area.

(a) of FIG. 14 shows a substrate with an antenna module 1000*b* for each area. A substrate 1010*b* may include a central region CR and a periphery PE surrounding the central region CR. The periphery PE of the substrate 1010*b* may include a first part P1 to a fourth part P4. The first part P1 constitutes a bottom region of the substrate 1010*b*, and the second part P2 constitutes one side region of the substrate 1010*b*. The third part P3 constitutes another side region of the substrate 1010*b*, and the fourth part P4 constitutes a top region of the substrate 1010*b*.

Referring to FIGS. 5 and 14, the antenna module 1000*b* may include a substrate 1010*b*, a first array antenna 1200*b*, a second array antenna 1300*b*, a third array antenna 1100*c*, and a fourth array antenna 1100*d*. Since the third and fourth array antennas 1100*c* and 1100*d* are disposed on the one side region and the another side region of the substrate 1010*b*, they may be referred to as first and second side array antennas.

(a) of FIG. 15 is a sectional view of the antenna module 1000*b*, and (b) of FIG. 15 is a sectional view of the substrate 1010*b* shown for each layer. (a) of FIG. 16 shows a perspective view of one side region based on the center of the antenna module 1000*b*. (b) of FIG. 16 is an enlarged view illustrating an area where some of dipole antennas MA11 to MA14 constituting the second array antenna 1300*b* of the antenna module are disposed.

Referring to FIG. 15, an RFIC 1400*a* may be disposed on the first layer La1 of the antenna module 1000*b*. A plurality of ground layers may be disposed in an inner region of the antenna module 1000*b*. For example, first, second, third, and fourth ground layers GND1, GND2, GND3, and GND4 may be disposed on the second, fourth, fifth, and seventh layers La2, La4, La5, and La7.

Conductive patterns in the inner region of the antenna module 1000*b* may be stacked by being separated in a height direction by a plurality of dielectric layers. For example, the first dielectric layer GND1 may be disposed between the first and second layers La1 and La2, and the second dielectric layer GND2 may be disposed between the third and fourth layers La3 and La4. The third dielectric layer GND3 may be disposed between the fourth and fifth layers La4 and La5, and the fourth dielectric layer GND4 may be disposed between the sixth and seventh layers La6 and La7.

A plurality of coplanar waveguide layers may be disposed on the respective layers in the inner region of the antenna module 1000*b*. A first coplanar waveguide layer WG1 in which a plurality of signal connection lines and ground portions are formed may be disposed on the third layer La3. A second coplanar waveguide layer WG2 in which a plurality of signal connection lines and ground portions are formed may be disposed on the sixth layer La6.

It may be considered that a plurality of dielectric layers are disposed on respective layers corresponding to ground layers of the antenna module 1000*b*. In this regard, a plurality of dielectric layers may be disposed in the inner region of the antenna module 1000*b*. For example, first, second, third, and fourth dielectric layers DL1, DL2, DL3, and DL4 may be disposed on the second, fourth, fifth, and seventh layers La2, La4, La5, and La7.

Referring to FIG. 15, the first layer La1 may be an interface layer IL of the RFIC 1400*b*, and the second layer La2 is the first ground layer GND1 having ground and via. The first dielectric layer DL1 may be disposed between the first and second layers La1 and La2, and the second layer La2 may include the first ground layer GND1 and the first dielectric layer DL1.

The third layer La3 is a first coplanar waveguide layer WG1 in which a plurality of conductive patterns and ground portions are formed. The fourth layer La4 is the second ground layer GND2 including ground and via. The second dielectric layer DL2 may be disposed between the third and fourth layers La3 and La4, or the fourth layer La4 may include the second dielectric layer DL2.

The third dielectric layer DL3 may be disposed between the fourth and fifth layers La4 and La5, or the fifth layer La5 may include the third dielectric layer DL3. The fifth layer La5 is the third ground layer GND3 including ground and via. The sixth layer La6 is the second coplanar waveguide layer WG2 in which a plurality of conductive patterns and ground portions are formed. The fourth dielectric layer DL4 may be disposed between the sixth and seventh layers La6 and La7, or the seventh layer La7 may include the fourth dielectric layer DL4.

Referring to FIGS. 14 to 16, the first array antenna 1200*b* may further include dummy pads DP11 to DP22 disposed on one side and another side of the patch antennas PA11 to PA28. Among the dummy pads DP11 to DP22, the first dummy pad DP11 is disposed between the first patch antenna PA11 in a first row and the second part P2. The second dummy pad DP12 is disposed between the second patch antenna PA12 in the first row and the second part P2. Among the dummy pads DP11 to DP22, the third dummy pad DP21 is disposed between the first patch antenna PA21 in a second row and the third part P3. The fourth dummy pad DP22 is disposed between the second patch antenna PA22 in the second row and the third part P3.

The ground wall (GW) 1130 may be formed to surround the dummy pads DP11 to DP22. First patch antennas 1220 of the plurality of patch antennas PA11 to PA28 may be connected to feed lines. The dummy pads DP11 to DP22 are not connected to the feed lines. Second patch elements 1220 of the plurality of patch antennas PA11 to PA28 are not connected to the feed lines.

A distance between the ground wall (GW) 1130 and the dummy pads DP11 to DP22, respective sizes thereof, and the like may be implemented within a predetermined range based on a half wavelength of an operating frequency of 60 GHz. Layer positions and sizes of conductive plates CP11 to CP28 corresponding to coupling pads and overlap areas with the patch antennas PA11 to PA28 may be designed in consideration of radiation characteristics and disposition characteristics.

Referring to FIGS. 14 to 16, the antenna module 1000*b* may further include a millimeter wave transceiver circuitry 1400*b*.

The substrate 1010*b* may include a first surface S1, a second surface S2, a periphery PE, and a central region CR. The periphery PE may be formed between the first surface S1 and the second surface S2. The first surface S1 may be opposite to the second surface S2. The substrate 1010*b* may be implemented as a multi-layered substrate. For example, the substrate 1010*b* may be implemented as a 12-layer substrate, but is not limited thereto, and may vary depending on applications. The first surface S1 of the substrate 1010*b* may correspond to a surface of a twelfth layer La12.

The substrate 1010*a* may have a plurality of side surfaces. Among the plurality of side surfaces, the first surface S1 may be disposed to face a front direction of the antenna module 1000*a*, and the second surface S2 may be disposed to face a rear direction of the antenna module 1000*a*. Among the plurality of side surfaces, the third and fourth surfaces S3 and S4 may be disposed to face left and right directions, respectively. Among the plurality of side surfaces, a fifth surface S5 may be configured to face a bottom direction of the antenna module.

The third array antenna 1100*c* and the fourth array antenna 1100*d* may be disposed on the second part P2 and the third part P3 of the periphery PE of the substrate 1010*b*. The third array antenna 1100*c* and the fourth array antenna 1100*d* may form beam patterns to side regions of the electronic device. The third array antenna 1100*c* and the fourth array antenna 1100*d* may radiate horizontally polarized signals to side regions of the electronic device.

The third array antenna 1100*c* may include a plurality of first monopole antennas MA1 to MA3 disposed on the second part P2 of the periphery PE of the substrate 1010*b*. The fourth array antenna 1100*d* may include a plurality of first monopole antennas MA4 to MA6 disposed on the third part P3 of the periphery PE of the substrate 1010*b*. The third array antenna 1100*c* and the fourth array antenna 1100*d* may be implemented with three antenna elements, respectively, on one side and another side of the periphery PE of the substrate 1010*b*. The third array antenna 1100*c* may be implemented as a 1×3 array antenna on one side of the substrate 1010*b*, but is not limited thereto. The fourth array antenna 1100*d* may be implemented as a 1×3 array antenna on another side of the substrate 1010*b*, but is not limited thereto.

The first array antenna 1200*b* may be disposed on the first surface S1 of the substrate 1010*b*. The first array antenna 1200*b* may form a beam pattern toward the front area of the electronic device. The first array antenna 1200*b* may radiate a horizontally polarized signal to the front area of the electronic device. The first array antenna 1200*b* may be implemented as 16 antenna elements on the central region CR of the substrate 1010*b*.

The first array antenna 1200*b* may include a plurality of patch antennas PA11 to PA18 and PA21 to PA28 disposed on the first surface S1 of the substrate 1010*b*. Dummy pads DP11 and DP21 may be disposed on one side of the patch antennas PA11 and P21 to suppress side surface radiation. The dummy patch antennas DP11 and DP21 may be disposed on another side of the patch antennas PA11 and P21 to suppress side surface radiation. The second array antenna 1300*b* may be implemented as 16 2×8 array antennas on the center region CR of the substrate 1010*b*, but is not limited thereto.

Each patch antenna of the first array antenna 1200*b* may include first patch antenna 1220 and a second patch element 1210. The second patch element 1210 may be stacked in a direction perpendicular to the first patch antenna 1220 such that signals of the first patch antenna 1220 are coupled. The center of the second patch element 1210 may be offset from the center of the first patch antenna 1220 in one axial direction. The center of the second patch element 1210 may be disposed in another axial direction perpendicular to the one axial direction with respect to the center of the first patch antenna 1220.

A second gap between adjacent first patch elements 1221 and 1222 may be larger than a first gap between adjacent second patch elements 1211 and 1212. To this end, the first patch element 1221 in a first column may be disposed to be offset in the left direction with respect to the second patch element 1211 in the first column. Meanwhile, the first patch element 1222 in a second column may be disposed to be offset in the right direction with respect to the second patch element 1212 in the second column. A current flow direction of a signal applied to the second patch element 1211 in the first column is the left direction, and a current flow direction of a signal applied to the second patch element 1212 in the second column is the right direction. The current flow directions of the signals applied to the second patch elements 1211 and 1212 in the first and second columns are opposite to each other. Accordingly, a phase difference of the signals applied to the second patch elements 1211 and 1212 in the first and second columns is supposed to be 180 degrees so that the current flow directions can be the same. To this end, the RFIC 1400*b* may control a phase shifter such that the phase difference between the signals applied to the second patch elements 1211 and 1212 in the first and second columns is 180 degrees.

The second array antenna 1300*b* may be disposed on the first part P1 of the periphery PE of the substrate 1010*a*. The second array antenna 1300*b* may form a beam pattern toward the bottom region of the electronic device. The second array antenna 1300*b* may radiate a vertically polarized signal to the bottom region of the electronic device.

The second array antenna 1300*b* may include the plurality of second monopole antennas MA11 to MA20 disposed on the first part P1 of the periphery PE of the substrate 1010*b*. The second array antenna 1300*b* may be implemented with 10 antenna elements on the lower side of a periphery PE of a substrate 1010*a*. The second array antenna 1300*b* may be implemented with 10 1×10 array antennas on a lower side of the periphery PE of the substrate 1010*a*, but is not limited thereto.

The millimeter wave transceiver circuitry 1400*b* may be disposed on the second surface S2. The millimeter wave transceiver circuitry 1400*b* may be configured to transmit and receive signals at frequencies between 10 GHz and 400 GHz using at least one of the first array antenna 1200*b*, the second array antenna 1300*b*, and the third and fourth array antennas 1100*c* and 1100*d*. The millimeter wave transceiver circuitry 1400*b* may be configured to transmit and receive signals at frequencies between 10 GHz and 400 GHz using at least one of the plurality of first monopole antennas MA1 to MA6, the plurality of patch antennas PA11 to PA18 and PA21 to PA28, and the plurality of second monopole antennas MA11 to MA20. The millimeter wave transceiver circuitry 1400*b* may be referred to as a radio frequency integrated chip (RFIC).

The number of elements of the first array antenna 1200*b* forming the beam pattern toward the front area may be set to be greater than the number of elements of the second array antenna 1300*b* forming the beam pattern toward the bottom region. The number of elements of the second array antenna 1300*b* forming the beam pattern toward the bottom region may be set to be greater than the number of elements of the third and fourth array antennas 1100*c* and 1100*d* forming the beam pattern toward the side regions.

In this regard, 16 pins among 32 pins of the RFIC 1400*b* may be connected to the first array antenna 1200*a* forming the beam pattern toward the front area. Ten pins of the 32 pins of the RFIC 1400*b* may be connected to the second array antenna 1300*b* forming the beam pattern toward the bottom region. 6 pins of the 32 pins of the RFIC 1400*b* may be connected to the third and fourth array antennas 1100*c* and 1100*d* forming the beam pattern toward the side regions.

In this regard, the first array antenna 1200*b* has the largest number of elements, so it can transmit signals over a long distance to the front area of the electronic device, but has a narrow beam coverage. The narrow beam coverage can be supplemented by changing a beam forming direction to a horizontal direction of the front area. Accordingly, the number of elements of the first array antenna 1200*b* may be plural in the one axis direction and two in the another axis direction. For example, the first array antenna 1200*b* may be implemented as 2×8 array antennas. A beam may be formed upward by a predetermined angle from the front direction through a phase difference between signals applied between the antenna elements in the first row and the antenna elements in the second row.

The electronic device needs to perform AV wireless communication with another electronic device disposed in a bottom region of the electronic device. For the AV wireless communication, beamforming may be implemented in units of narrow beam coverage in a horizontal direction, which is the one axial direction, in the bottom region of the electronic device. Meanwhile, it is not necessary to transmit a signal to a bottom region of the electronic device over a long distance. Accordingly, the number of elements of the second array antenna 1300*b* may be plural in the one axial direction and one in the another axial direction. For example, the second array antenna 1300*b* may be implemented as 1×8, 1×10, or 1×12 array antennas.

Signals may be transferred to the side regions of the electronic device in an indoor radio environment where the electronic device is disposed. It is more important to implement a wide beam coverage for the side regions of the electronic device even without beamforming, than to implement a signal transmission over a long distance. In this regard, since the number of elements of the third and fourth array antennas 1100*c* and 1100*d* is the smallest, a wide beam coverage to the side regions of the electronic device can be achieved. Accordingly, the number of elements of the third and fourth array antennas 1100*c* and 1100*d* may be plural in the one axial direction and one in the another axial direction. For example, the third and fourth array antennas 1100*c* and 1100*d* may be implemented as 1×3 array antennas on one side and another side.

In the above, the disposition structure of the feed lines for each layer in the multi-layered antenna package having the plurality of array antennas according to one aspect of the present disclosure has been described. Hereinafter, a description will be given of a disposition structure of feed lines for each layer in an antenna module implemented as a multi-layered antenna package including a plurality of array antennas having a plurality of coplanar waveguide structures according to another aspect of the present disclosure. In this regard, an antenna module implemented as a multi-layered antenna package including a plurality of array antennas having a plurality of coplanar waveguide structures will be described with reference to FIGS. 1 to 16.

The antenna module 1000*a*, 1000*b* includes a transceiver circuitry 1400*a*, 1400*b*, first resonating elements 1300*a*, 1300*b*, second resonating elements 1200*a*, 1200*b*, and a plurality of signal connection lines SL1 to SL4. The antenna module 1000*a*, 1000*b* may further include a first coplanar waveguide WG1 and a second coplanar waveguide WG2. The first resonance elements 1300*a*, 1300*b* may correspond to the second array antenna 1300*a*, 1300*b*. The second resonant elements 1200*a*, 1200*b* may correspond to the first array antenna 1200*a*, 1200*b* and the phased array antenna portion 1200*a*, 1200*b*.

The first coplanar waveguide WG1 may be configured to convey first signals at a frequency of 10 GHz or higher between the transceiver circuitry 1400*a*, 1400*b* and the first resonant elements 1300*a*, 1300*b*. The second coplanar waveguide WG2 may be configured to convey second signals at the frequency of 10 GHz or higher between the transceiver circuitry 1400*a*, 1400*b* and the second resonant elements 1200*a*, 1200*b*.

The first coplanar waveguide WG1 may be interposed between the second coplanar waveguide WG2 and the transceiver circuitry 1400*a*, 1400*b*. The second coplanar waveguide WG2 may be interposed between the first coplanar waveguide WG1 and the second resonant elements 1200*a*, 1200*b*.

The first resonance elements 1300*a*, 1300*b* may be interposed between the second coplanar waveguide WG2 and the transceiver circuitry 1400*a*, 1400*b*. The second resonance elements 1200*a*, 1200*b* may be disposed on an opposite side of the transceiver circuitry 1400*a*, 1400*b*.

The second resonating elements 1200*a*, 1200*b* may be configured to radiate radio signals. The second resonant elements 1200*a*, 1200*b* may include a first patch antenna 1220 and a second patch antenna 1210. In another embodiment, the second resonating elements 1200*a*, 1200*b* may include a patch antenna 1210*b*.

Each of the second resonant elements 1200*a*, 1200*b* may have a structure with two patch antennas. The first patch antenna 1220 of the two patch antennas may be on the first surface S1 of the PCB 1010*a*, 1010*b*. The first surface S1 may be an outermost surface of the PCB 1010*a*, 1010*b*. The second patch antenna 1210 of the two patch antennas may be disposed inside the PCB 1010*a*, 1010*b*. A portion of the first patch antenna 1220 and a portion of the second patch antenna 1210 may be stacked to overlap each other.

Each of the second resonant elements 1200*a*, 1200*b* may have a structure with one patch antenna. The patch antenna 1210*b* may be on the first surface S1 of the PCB 1010*a*, 1010*b*. The first surface S1 may be an outermost surface of the PCB 1010*a*, 1010*b*. The patch antenna 1210*b* may be disposed inside the PCB 1010*a*, 1010*b*.

The plurality of signal connection lines SL1 to SLA may be configured to connect the transceiver circuitry 1400*a*, 1400*b* to the phased array antenna portion 1200*a*, 1200*b*. Each of the plurality of signal connection lines SL1 to SL4 may be fed by being connected to the second patch antennas 1210 disposed inside the PCB 1010*a*, 1010*b*. Each of the plurality of signal connection lines SL1 to SL4 may be configured not to be directly connected to the first patch antennas 1210 on the first surface S1 of the PCB 1010*a*, 1010*b*.

A length of each of the plurality of signal connection lines SL1 to SL4 may be defined as a length of a connection line connected between the RFIC 1400*a*, 1400*b* and the phased array antenna portion 1200*a*. The plurality of signal connection lines SL1 to SLA may have the same length for each of the second resonant elements 1200*a*, 1200*b*. The length of the plurality of signal connection lines SL1 to SL4 may be defined as a length of a connection line connected between the transceiver circuitry 1400*a*, 1400*b* and the patch antenna 1210, 1210*b*.

The plurality of signal connection lines SL1 to SL4 may be disposed between the phased array antenna portion 1200*a*, 1200*b* and the RFIC 1400*a*, 1400*b* inside the PCB 1010*a*, 1010*b*. The plurality of signal connection lines SL1 to SL4 may be disposed on the second coplanar waveguide WG2.

The second coplanar waveguide WG2 may be disposed on a conductive plate between two ground conductive plates GND3 and GND4 inside the PCB 1010*a*, 1010*b*. The conductive plate of the second coplanar waveguide WG2 may include a plurality of signal connection lines SL3 and ground portions. The plurality of signal connection lines and ground portions may be disposed on the coplanar conductive plate between the two ground conductive plates inside the PCB 1010*a*, 1010*b*.

Each of the plurality of signal connection lines SL1 to SL4 may include a first part SL1, a second part SL2, a third part SL3, and a fourth part SLA. The first part SL1 may be disposed on the second surface S2 of the PCB 1010*a*. The third part SL3 may be configured to have a coplanar waveguide structure WG2. The second part SL2 may be configured to electrically connect the first part SL1 and the third part SL3. The fourth part SL4 may be configured to electrically connect the third part SL3 and one of the second patch antennas 1220.

A first ground region 1100*g* configured as a metal surface may be defined between the coplanar waveguide structure WG2 and the RFIC chip 1400*a*. A second ground region 1200*g* may be defined between the coplanar waveguide structure WG2 and the second patch antenna 1210.

The PCB 1010*a*, 1010*b* may include first to sixth layers La1 to La6. The first parts SL1 of the plurality of signal connection lines may be disposed on the first layer La1 of the PCB 1010*a*, 1010*b*. The second parts SL2 of the plurality of signal connection lines may be formed by first vertical vias from the first layer La1 to the sixth layer La6 of the PCB 1010*a*, 1010*b*. The third parts SL3 of the plurality of signal connection lines may be disposed on the sixth layer La6 of the PCB 1010*a*, 1010*b*. The fourth parts SLA of the plurality of signal connection lines may be formed by second vertical vias from the sixth layer La6 to the second patch antenna 1220.

For the second resonating elements 1200*a*, 1200*b*, the first parts SL1 on the first layer La1 may have the same length. For the second resonant elements 1200*a*, 1200*b*, the third parts SL3 on the sixth layer La6 may have the same length.

For the second resonating elements 1200*a*, 1200*b*, the first vertical vias corresponding to the first parts SL2 may have the same length (height). For the second resonating elements 1200*a*, 1200*b*, the second vertical vias corresponding to the fourth parts SL4 may have the same height.

The feed lines of the first layer La1 may be connected to the feed lines F1 to F16 of the sixth layer La1 through the first vertical vias passing through the first and second ground layers GND1 and GND2. The feed lines F1 to F16 of the sixth layer La1 may be connected to the second patch antennas 1210. All of the feed lines F1 to F16 of the sixth layer La1 may be formed to have the same length.

In the above, an electronic device having an antenna module has been described. The technical effects of the electronic device having the antenna module according to the present disclosure are as follows.

An electronic device according to an embodiment of the present disclosure may perform wireless communication of A/V data regardless of the location of an A/V transmitting device through first and second antenna structures in which a plurality of array antennas are disposed.

Furthermore, the A/V transmitting device may transmit two streams of data, thereby minimizing video quality deterioration that occurs when increasing a data compression rate.

In addition, since a horizontally polarized antenna and a vertically polarized antenna can be disposed together on one substrate, thereby allowing an antenna module to be compact and providing a high data reception rate.

Moreover, horizontally and vertically polarized signals may be used according to an array antenna disposition structure of the A/V transmitting device and the electronic device, thereby performing A/V wireless communication with reduced mutual interference while increasing a communication capacity.

Besides, horizontally and vertically polarized signals may be used in consideration of the location of the A/V transmitting device and electronic device the polarization characteristics of the array antennas, thereby performing A/V wireless communication with reduced mutual interference while increasing a communication capacity.

In addition, even when an obstacle is disposed on a wireless communication path between the A/V transmitting device and the electronic device, a beamforming direction may be changed and reflected waves may be used, thereby providing seamless A/V wireless communication.

Also, the number of array antennas disposed in a front area of the antenna module of the A/V transmitting device may be greater than the number of antennas in a side region or bottom region. Accordingly, signals can be transmitted over a longer distance in the front area of the antenna module than in the side region or bottom region. Also, an antenna module that has two-dimensional array antennas and is capable of transmitting signals even upward through beamforming can be implemented.

Also, the number of array antennas disposed in side regions of the antenna module of the A/V transmitting device may be greater than the number of antennas in other areas. Accordingly, an antenna module capable of achieving a wider beam coverage in the side regions than that in a front or bottom region can be implemented.

Further scope of applicability of the present disclosure will become apparent from the following detailed description. It should be understood, however, that the detailed description and specific examples, such as the preferred embodiments of the present disclosure, are given by way of illustration only, since various modifications and alternations within the spirit and scope of the disclosure will be apparent to those skilled in the art. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna module implemented as a multi-layered package, the antenna module comprising:

a printed circuit board (PCB) having a plurality of layers;

an array antenna portion including a plurality of antenna elements disposed in and on the PCB, wherein each of the plurality of antenna elements has a structure with two patch antennas, first patch antennas of the structure with two patch antennas being located on a first surface of the PCB, the first surface being an outermost surface of the PCB, wherein second patch antennas of the structure with two patch antennas are disposed inside the PCB, and a portion of the first patch antennas and a portion of the second patch antennas are stacked to overlap each other;

a radio frequency integrated circuit (RFIC) chip bonded to a second surface of the PCB, the second surface being another outermost surface of the PCB; and a plurality of signal connection lines connected from the RFIC chip to the array antenna portion, wherein the plurality of signal connection lines are fed by being connected respectively from the RFIC chip to the second patch antennas of the structure with two patch antennas that are disposed inside the PCB, a length of each of the plurality of signal connection lines is a length of a connection line connected between the RFIC chip and the second patch antennas, and the plurality of signal connection lines have a same length, wherein each of the plurality of signal connection lines is disposed between the second patch antennas disposed inside the PCB and the RFIC chip, and each of the plurality of signal connection lines comprises:

a first part on the second surface of the PCB, a third part forming a coplanar waveguide structure inside the PCB, a second part electrically connecting the first part and the third part, and a fourth part electrically connect the third part and one of the second patch antennas.

2. The antenna module of claim 1, wherein a first ground region configured as a metal surface is defined between the coplanar waveguide structure and the RFIC chip, and a second ground region is defined between the coplanar waveguide structure and the second patch antennas.

3. The antenna module of claim 1, wherein the PCB comprises first to sixth layers, the first parts of the signal connection lines are disposed on a first layer of the PCB, the second parts of the signal connection lines are formed by first vertical vias from the first layer to a sixth layer of the PCB, the third parts of the signal connection lines are formed by second vertical vias from the sixth layer to the second patch antennas, the first parts of the signal connection lines have a same length on the first layer for the plurality of antenna elements, and the fourth parts of the signal connection lines have a same length on the sixth layer for the plurality of antenna elements.

4. The antenna module of claim 3, wherein the first vertical vias have a same height for the plurality of antenna elements, the second vertical vias have a same height for the plurality of antenna elements, feed lines of the first layer are connected to feed lines of the sixth layer through the first vertical vias passing through first and second ground layers, the feed lines of the sixth layer are connected to the second patch antennas, and the feed lines of the sixth layer have a same length.

5. The antenna module of claim 1, wherein the array antenna portion comprises:

a first array antenna portion in which eight first patch antennas and eight second patch antennas are disposed in a first column in an X-axial direction; and a second array antenna portion in which eight first patch antennas and eight second patch antennas are disposed in a second column in the X-axial direction, the array antenna portion is implemented as a 2×8 array antenna, the first array antenna portion is disposed on an upper portion based on the X axis, and the second array antenna portion is disposed on a lower portion based on the X axis.

6. The antenna module of claim 5, wherein the first parts of the plurality of signal connection lines are connected to pins of a first side, a second side, and a fourth side of the RFIC chip, the first side is a top region of the RFIC chip, the second side is one side (left) region of the RFIC chip, the fourth side is another side (right) region of the RFIC chip, and the third part of each of the plurality of signal connection lines is formed in a symmetrical structure based on a center of a Y axis of the PCB.

7. The antenna module of claim 6, wherein a first patch of the first array antenna portion is connected to the second side of the RFIC chip through a feed line, a second patch of the first array antenna portion is connected to the first side of the RFIC chip through a feed line;

a third patch of the first array antenna portion is connected to the first side of the RFIC chip through a feed line, a fourth patch of the first array antenna portion is connected to the first side of the RFIC chip through a feed line, the first patch to the fourth patch are sequentially disposed on an upper left portion of the PCB, and the feed lines of the first patch to the fourth patch are disposed on the upper left portion of the PCB.

8. The antenna module of claim 7, wherein a fifth patch of the first array antenna portion is connected to the first side of the RFIC chip through a feed line, a sixth patch of the first array antenna portion is connected to the first side of the RFIC chip through a feed line, a seventh patch of the first array antenna portion is connected to the first side of the RFIC chip through a feed line, an eighth patch of the first array antenna portion is connected to the fourth side of the RFIC chip through a feed line, the fifth patch to the eighth patch are sequentially disposed on an upper right portion of the PCB, and the feed lines of the fifth patch to the eighth patch are disposed on the upper right portion of the PCB.

9. The antenna module of claim 6, wherein a first patch of the second array antenna portion is connected to the second side of the RFIC chip through a feed line, a second patch of the second array antenna portion is connected to the second side of the RFIC chip through a feed line;

a third patch of the second array antenna portion is connected to the second side of the RFIC chip through a feed line, a fourth patch of the second array antenna portion is connected to the first side of the RFIC chip through a feed line, the first patch to the fourth patch are sequentially disposed on a lower left portion of the PCB, and the feed lines of the first patch to the fourth patch are disposed on the lower left portion of the PCB.

10. The antenna module of claim 9, wherein a fifth patch of the second array antenna portion is connected to the first side of the RFIC chip through a feed line, a sixth patch of the second array antenna portion is connected to the fourth side of the RFIC chip through a feed line, a seventh patch of the second array antenna portion is connected to the fourth side of the RFIC chip through a feed line, an eighth patch of the second array antenna portion is connected to the fourth side of the RFIC chip through a feed line, the fifth patch to the eighth patch are sequentially disposed on a lower right portion of the PCB, and the feed lines of the fifth patch to the eighth patch are disposed on the lower right portion of the PCB.

11. An antenna module implemented as a multi-layered package, the antenna module comprising:

a printed circuit board (PCB) having a plurality of layers;

an array antenna portion including a plurality of patch antennas disposed on a first surface of the PCB, the first surface being an outermost surface of the PCB, wherein each of the plurality of patch antennas has a patch antenna structure, each patch antenna structure being located on the first surface of the PCB;

a radio frequency integrated circuit (RFIC) chip bonded to a second surface of the PCB, the second surface being another outermost surface of the PCB; and a plurality of signal connection lines connected from the RFIC chip to the array antenna portion, wherein the plurality of signal connection lines are fed by being connected respectively from the RFIC chip to the plurality of patch antennas disposed on the first surface of the PCB, a length of each of the plurality of signal connection lines is a length of a connection line connected between the RFIC chip and the patch antennas, and the plurality of signal connection lines have a same length, wherein each of the plurality of signal connection lines is disposed between the patch antennas on the first surface inside the PCB and the RFIC chip, and each of the plurality of signal connection lines comprises:

a first part on the second surface of the PCB, a third part forming a coplanar waveguide structure inside the PCB, a second part electrically connecting the first part and the third part, and a fourth part electrically connect the third part and one of the patch antennas.

12. The antenna module of claim 11, wherein a first ground region configured as a metal surface is defined between the coplanar waveguide structure and the RFIC chip, and a second ground region is defined between the coplanar waveguide structure and the patch antennas.

* * * * *